US012593234B2

(12) United States Patent
Lo et al.

(10) Patent No.: US 12,593,234 B2
(45) Date of Patent: Mar. 31, 2026

(54) METHOD AND APPARATUS FOR CSI REPORT CONFIGURATION FOR CSI PREDICTIONS IN ONE OR MORE DOMAINS

(71) Applicant: Samsung Electronics Co., Ltd., Suwon-si (KR)

(72) Inventors: Caleb K. Lo, San Jose, CA (US); Gilwon Lee, McKinney, TX (US); Jeongho Jeon, San Jose, CA (US); Pranav Madadi, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 18/300,709

(22) Filed: Apr. 14, 2023

(65) Prior Publication Data

US 2023/0337036 A1 Oct. 19, 2023

Related U.S. Application Data

(60) Provisional application No. 63/393,115, filed on Jul. 28, 2022, provisional application No. 63/388,368, filed on Jul. 12, 2022, provisional application No. 63/332,579, filed on Apr. 19, 2022.

(51) Int. Cl.
*H04W 24/10* (2009.01)
*H04W 24/02* (2009.01)
*H04W 24/08* (2009.01)

(52) U.S. Cl.
CPC ........... *H04W 24/10* (2013.01); *H04W 24/02* (2013.01); *H04W 24/08* (2013.01)

(58) Field of Classification Search
CPC ..... H04W 24/10; H04W 24/02; H04W 24/08; H04W 8/24; H04W 64/006;

(Continued)

(56) References Cited

U.S. PATENT DOCUMENTS

2011/0280287 A1 11/2011 Cheng et al.
2012/0250557 A1* 10/2012 Zirwas ................ H04W 72/542
370/252

(Continued)

FOREIGN PATENT DOCUMENTS

WO 2020025109 A1 2/2020
WO 2021016770 A1 2/2021
WO 2021242393 A1 12/2021

OTHER PUBLICATIONS

International Search Report and Written Opinion issued Jul. 24, 2023 regarding International Application No. PCT/KR2023/ 005203, 8 pages.

(Continued)

*Primary Examiner* — Edan Orgad
*Assistant Examiner* — Samuel Roberge Bettendorf

(57) ABSTRACT

Apparatuses and methods for a CSI report configuration for CSI predictions in one or more domains. A method performed by a user equipment (UE) includes transmitting capability information indicating capability of the UE to support machine learning (ML) based channel state information (CSI) prediction in one or more domains, receiving configuration information that indicates parameters for ML based CSI prediction in the one or more domains; receiving CSI reference signals (RSs), and measuring the CSI-RSs. The method further includes determining, based on the configuration information and the measured CSI-RSs, a plurality of CSI predictions in the one or more domains; determining a CSI report including one or more of the plurality of CSI predictions and dependency information indicating dependencies between CSI predictions in the plurality of CSI predictions; and transmitting the CSI report.

20 Claims, 25 Drawing Sheets

(58) Field of Classification Search
  CPC ......... H04W 72/0446; H04W 72/0453; H04W
                72/231; H04B 7/0626; H04B 7/0641;
                H04B 17/373; G06N 20/00; H04L 5/005
  See application file for complete search history.

(56)                References Cited

U.S. PATENT DOCUMENTS

| | | |
|---|---|---|
| 2017/0346580 A1 | 11/2017 | Astrom et al. |
| 2020/0366326 A1 | 11/2020 | Jassal et al. |
| 2021/0091838 A1 | 3/2021 | Bai et al. |
| 2021/0143883 A1 | 5/2021 | Yerramalli et al. |
| 2021/0258991 A1* | 8/2021 | Bao ..................... H04L 25/0254 |
| 2021/0351885 A1 | 11/2021 | Chavva et al. |
| 2021/0376895 A1* | 12/2021 | Xue ...................... H04B 7/0626 |
| 2022/0124836 A1 | 4/2022 | Tang |
| 2024/0314638 A1* | 9/2024 | Soldati ................. H04B 7/0632 |

OTHER PUBLICATIONS

"3rd Generation Partnership Project; Technical Specification Group Radio Access Network; NR; Physical channels and modulation (Release 17)", 3GPP TS 38.211 V17.1.0, Mar. 2022, 135 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.

"3rd Generation Partnership Project; Technical Specification Group Radio Access Network; NR; Multiplexing and channel coding (Release 17)", 3GPP TS 38.212 V17.1.0, Mar. 2022, 197 pages.

"3rd Generation Partnership Project; Technical Specification Group Radio Access Network; NR; Physical layer procedures for data (Release 17)", 3GPP TS 38.214 V17.1.0, Mar. 2022, 225 pages.

Zhou et al., "Incorporating Side-Channel Information into Convolutional Neural Networks for Robotic Tasks", 2017 IEEE International Conference on Robotics and Automation (ICRA), May 2017, 7 pages.

Extended European Search Report issued Apr. 28, 2025 regarding Application No. 23792134.1, 11 pages.

* cited by examiner

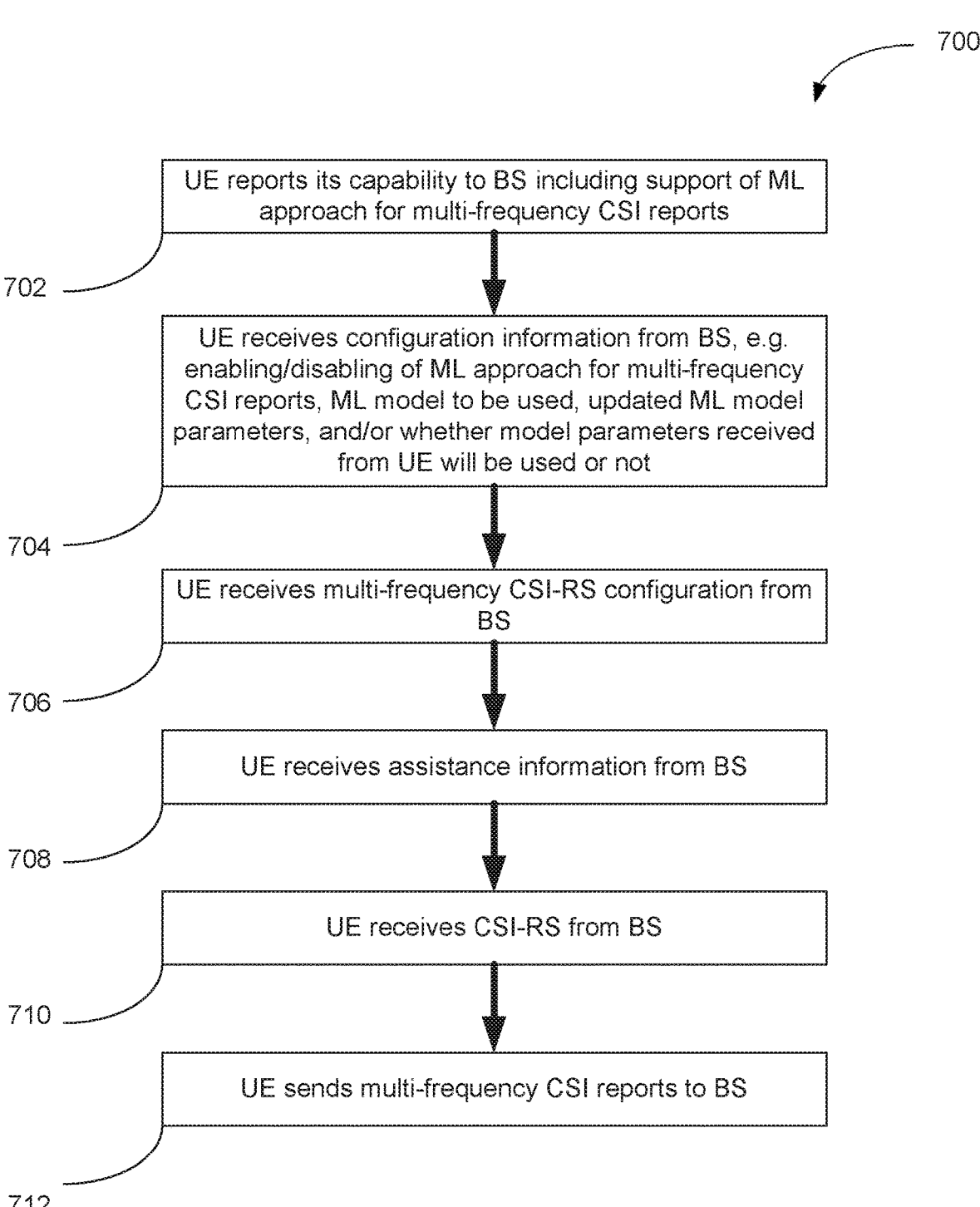

700

702 — UE reports its capability to BS including support of ML approach for multi-frequency CSI reports 704 — UE receives configuration information from BS, e.g. enabling/disabling of ML approach for multi-frequency CSI reports, ML model to be used, updated ML model parameters, and/or whether model parameters received from UE will be used or not 706 — UE receives multi-frequency CSI-RS configuration from BS 708 — UE receives assistance information from BS 710 — UE receives CSI-RS from BS 712 — UE sends multi-frequency CSI reports to BS

FIG. 7

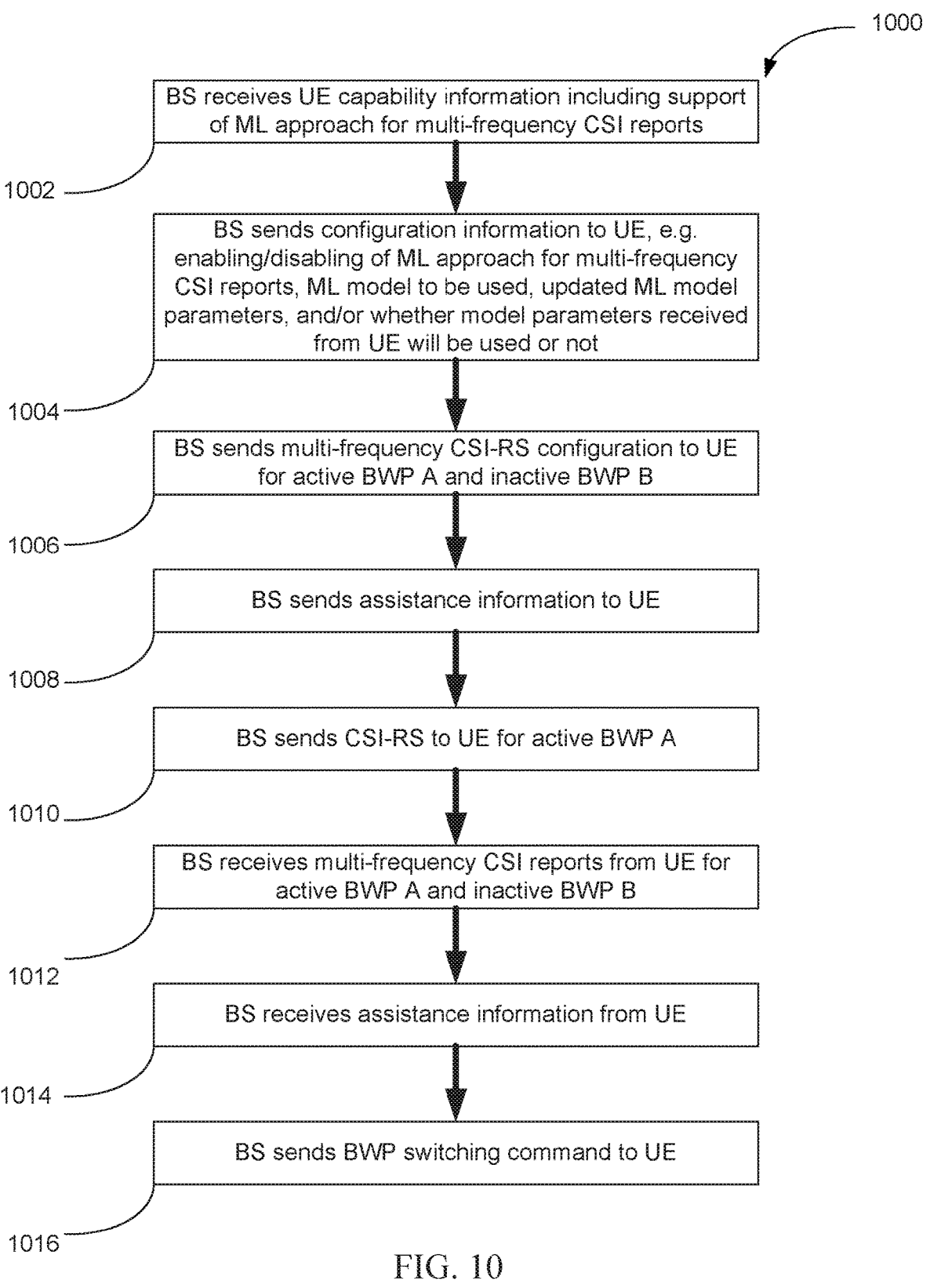

1000

1002 — BS receives UE capability information including support of ML approach for multi-frequency CSI reports 1004 — BS sends configuration information to UE, e.g. enabling/disabling of ML approach for multi-frequency CSI reports, ML model to be used, updated ML model parameters, and/or whether model parameters received from UE will be used or not 1006 — BS sends multi-frequency CSI-RS configuration to UE for active BWP A and inactive BWP B 1008 — BS sends assistance information to UE 1010 — BS sends CSI-RS to UE for active BWP A 1012 — BS receives multi-frequency CSI reports from UE for active BWP A and inactive BWP B 1014 — BS receives assistance information from UE 1016 — BS sends BWP switching command to UE

FIG. 10

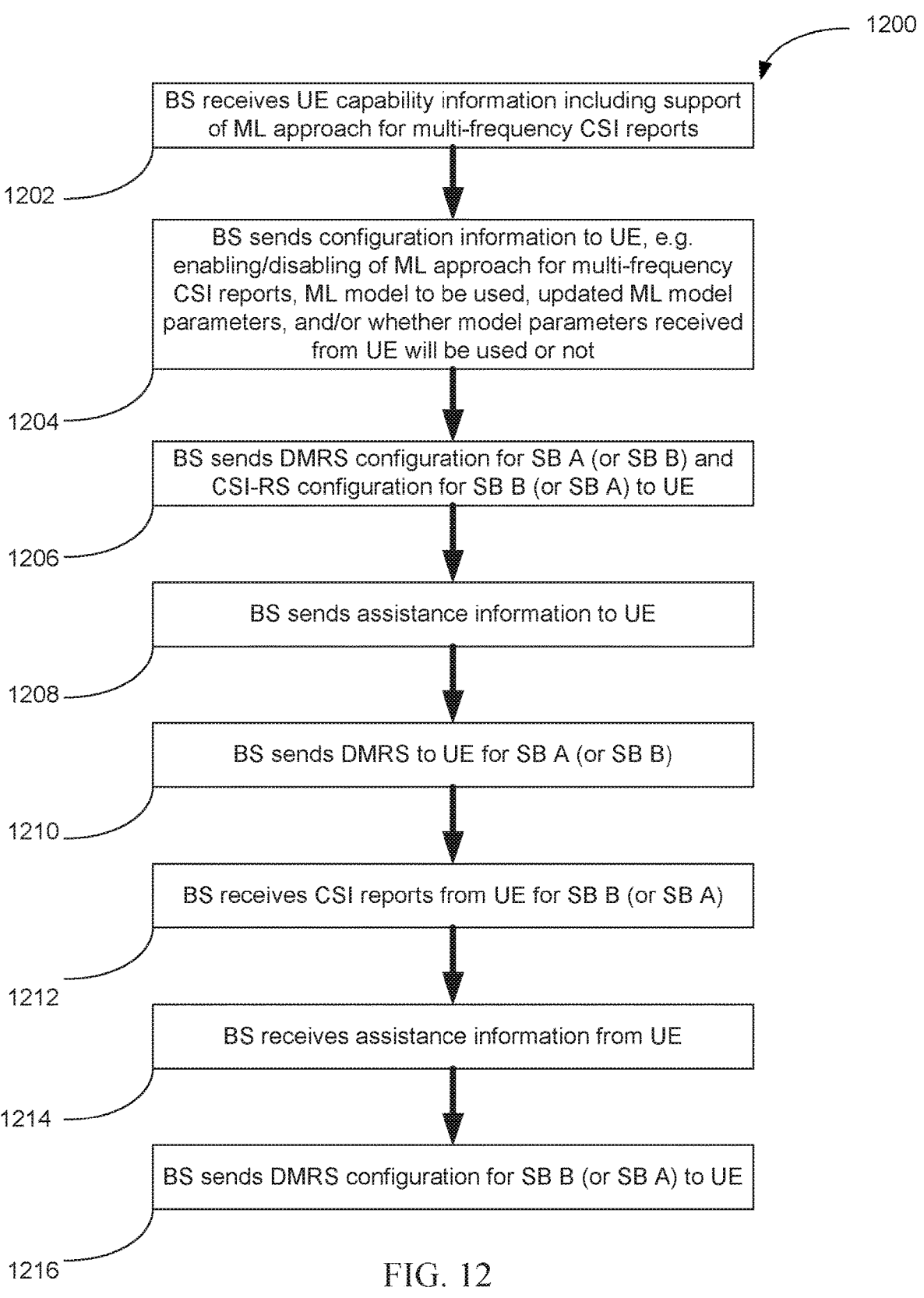

1200

BS receives UE capability information including support of ML approach for multi-frequency CSI reports

1202

BS sends configuration information to UE, e.g. enabling/disabling of ML approach for multi-frequency CSI reports, ML model to be used, updated ML model parameters, and/or whether model parameters received from UE will be used or not

1204

BS sends DMRS configuration for SB A (or SB B) and CSI-RS configuration for SB B (or SB A) to UE

1206

BS sends assistance information to UE

1208

BS sends DMRS to UE for SB A (or SB B)

1210

BS receives CSI reports from UE for SB B (or SB A)

1212

BS receives assistance information from UE

1214

BS sends DMRS configuration for SB B (or SB A) to UE

| R | Serving Cell ID | BWP ID |
|---|---|---|
| A/D | CSI-ResourceConfigID | |
| A/D | CSI-ResourceConfigID | |
| A/D | CSI-ResourceConfigID | |

1500

| Beamforming Information |
|---|
| Beamforming Information |
| Beamforming Information |

1600

1700

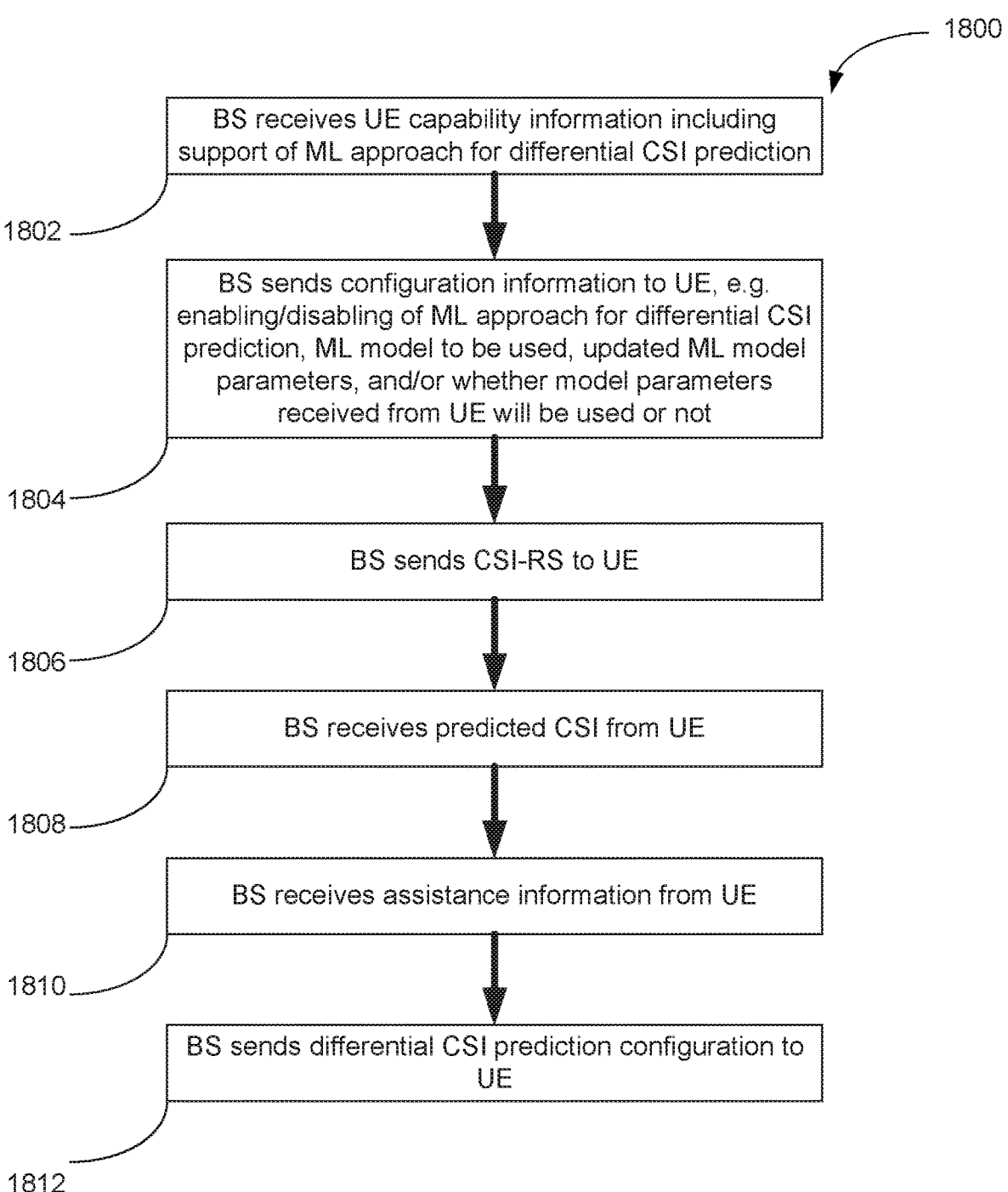

1800

1802 — BS receives UE capability information including support of ML approach for differential CSI prediction 1804 — BS sends configuration information to UE, e.g. enabling/disabling of ML approach for differential CSI prediction, ML model to be used, updated ML model parameters, and/or whether model parameters received from UE will be used or not 1806 — BS sends CSI-RS to UE 1808 — BS receives predicted CSI from UE 1810 — BS receives assistance information from UE 1812 — BS sends differential CSI prediction configuration to UE

FIG. 18

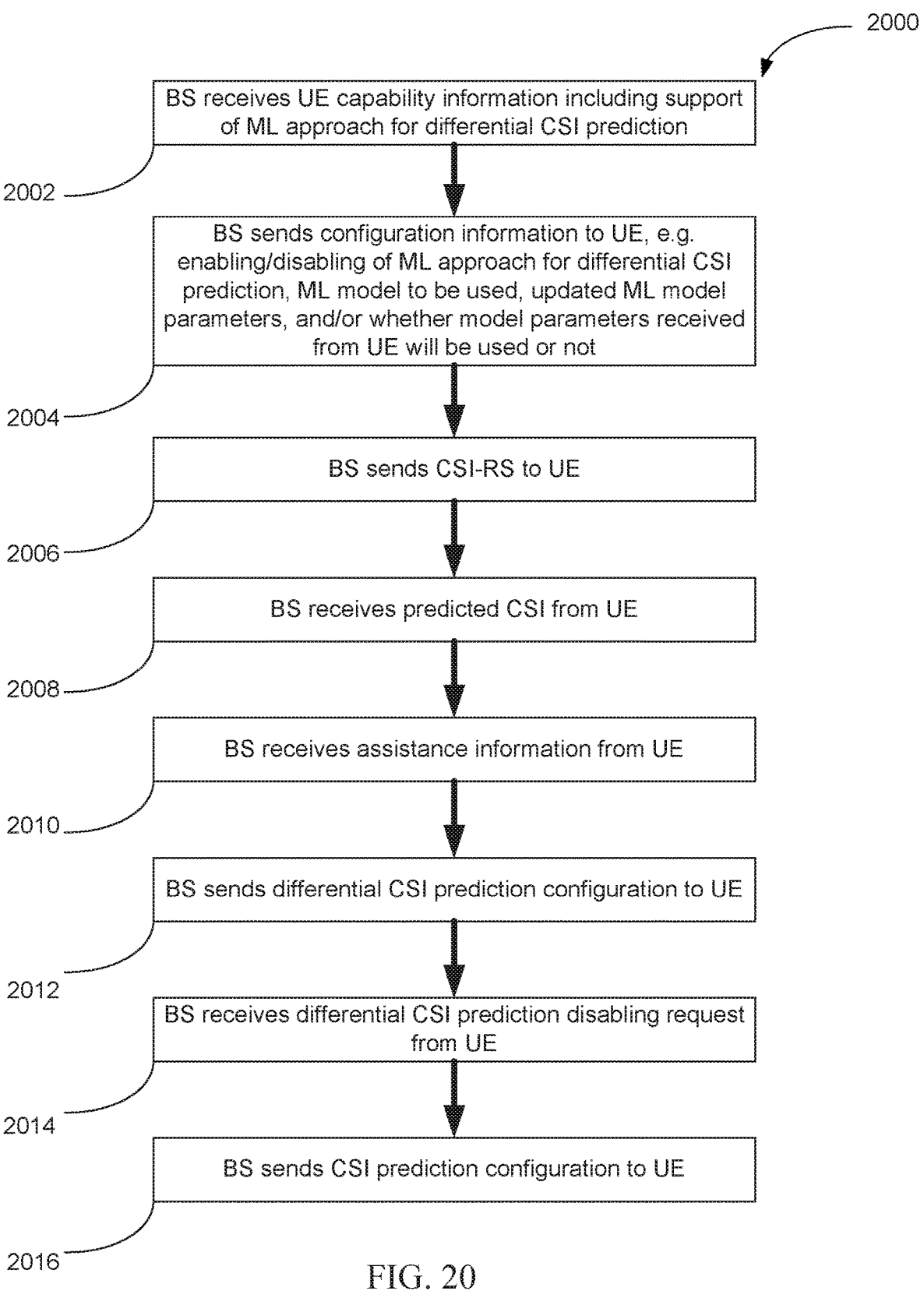

2000

2002 — BS receives UE capability information including support of ML approach for differential CSI prediction 2004 — BS sends configuration information to UE, e.g. enabling/disabling of ML approach for differential CSI prediction, ML model to be used, updated ML model parameters, and/or whether model parameters received from UE will be used or not 2006 — BS sends CSI-RS to UE 2008 — BS receives predicted CSI from UE 2010 — BS receives assistance information from UE 2012 — BS sends differential CSI prediction configuration to UE 2014 — BS receives differential CSI prediction disabling request from UE 2016 — BS sends CSI prediction configuration to UE

FIG. 20

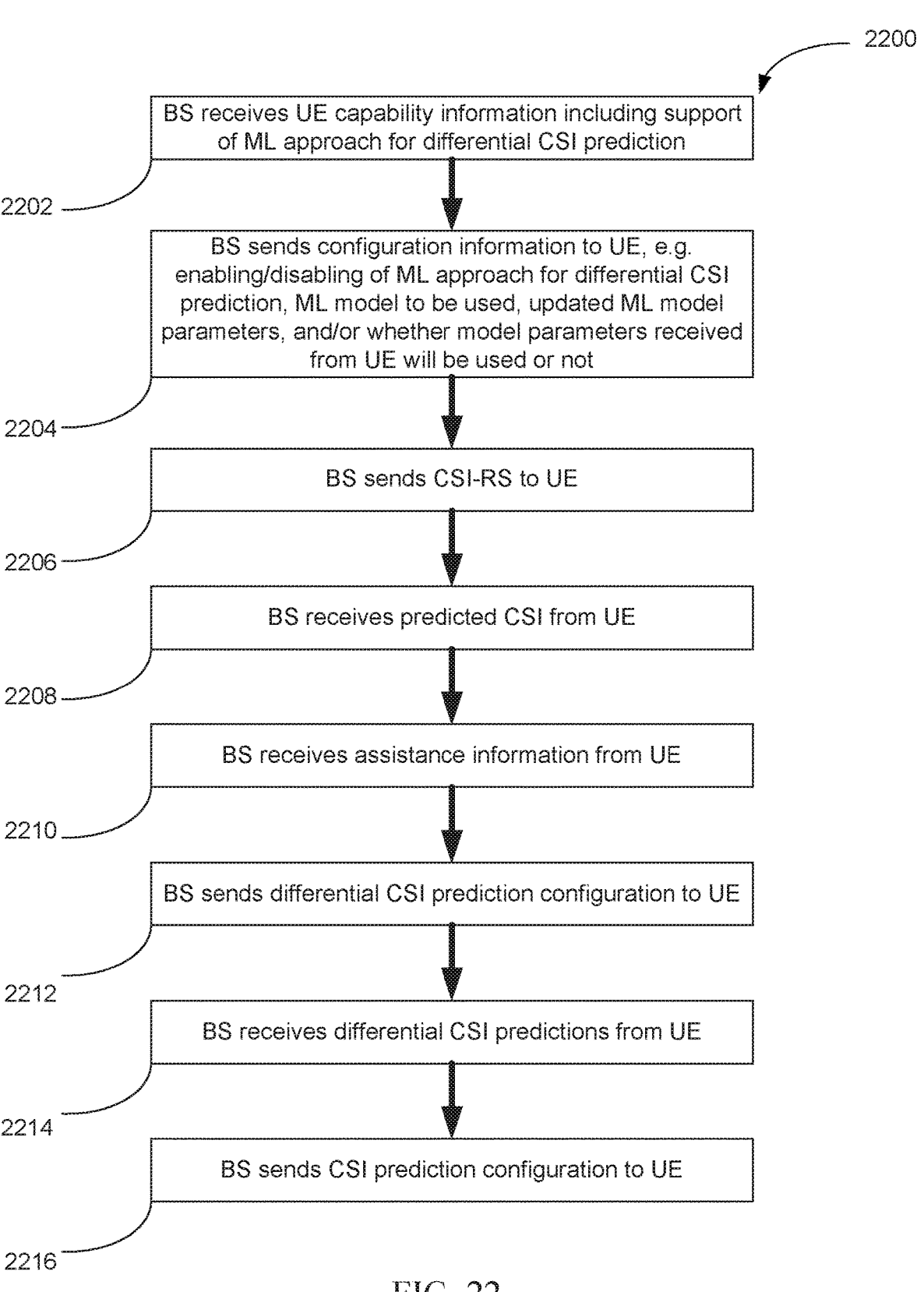

2200

2202 — BS receives UE capability information including support of ML approach for differential CSI prediction 2204 — BS sends configuration information to UE, e.g. enabling/disabling of ML approach for differential CSI prediction, ML model to be used, updated ML model parameters, and/or whether model parameters received from UE will be used or not 2206 — BS sends CSI-RS to UE 2208 — BS receives predicted CSI from UE 2210 — BS receives assistance information from UE 2212 — BS sends differential CSI prediction configuration to UE 2214 — BS receives differential CSI predictions from UE 2216 — BS sends CSI prediction configuration to UE

FIG. 22

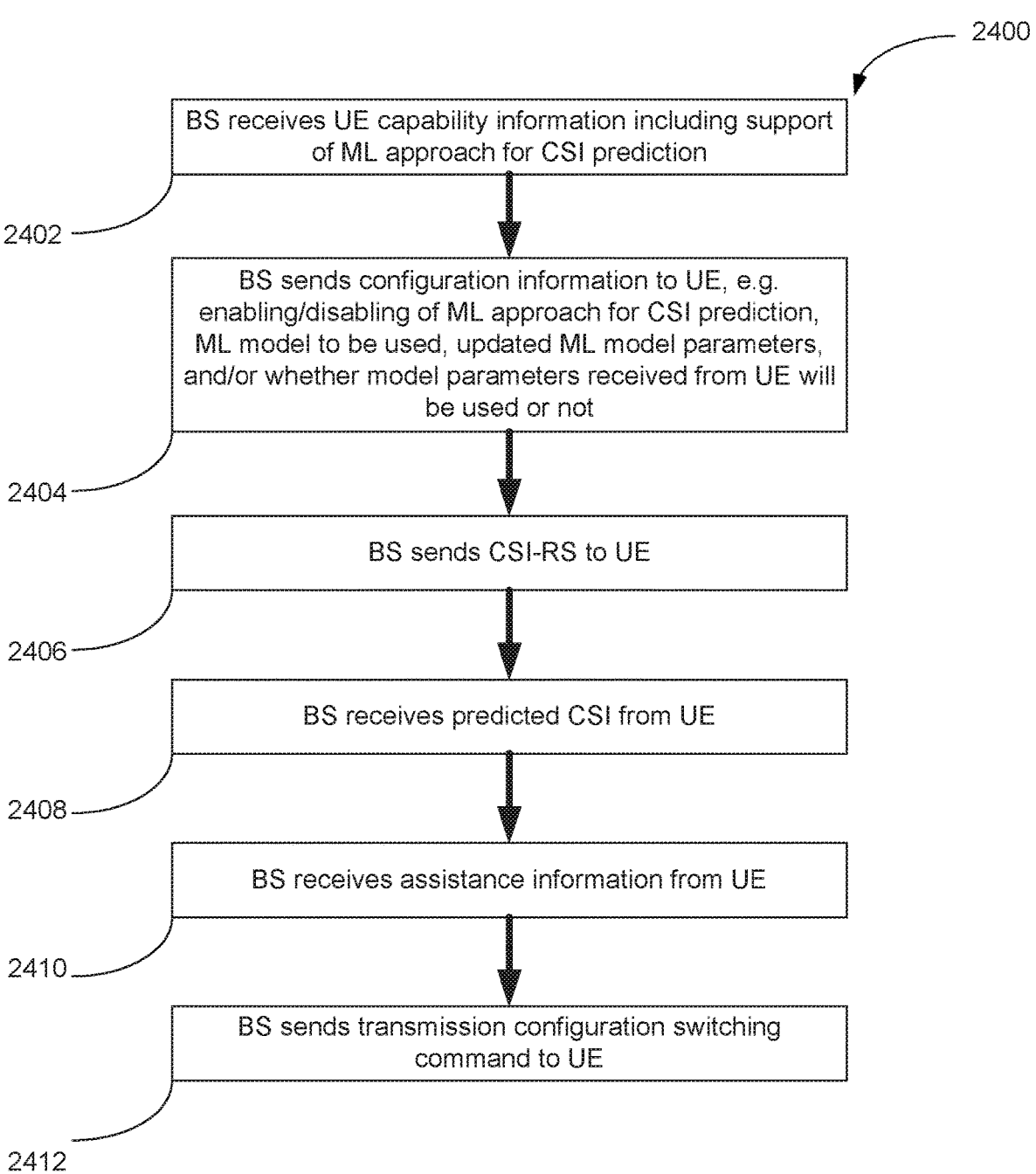

2400

BS receives UE capability information including support of ML approach for CSI prediction

2402

BS sends configuration information to UE, e.g. enabling/disabling of ML approach for CSI prediction, ML model to be used, updated ML model parameters, and/or whether model parameters received from UE will be used or not

2404

BS sends CSI-RS to UE

2406

BS receives predicted CSI from UE

2408

BS receives assistance information from UE

2410

BS sends transmission configuration switching command to UE

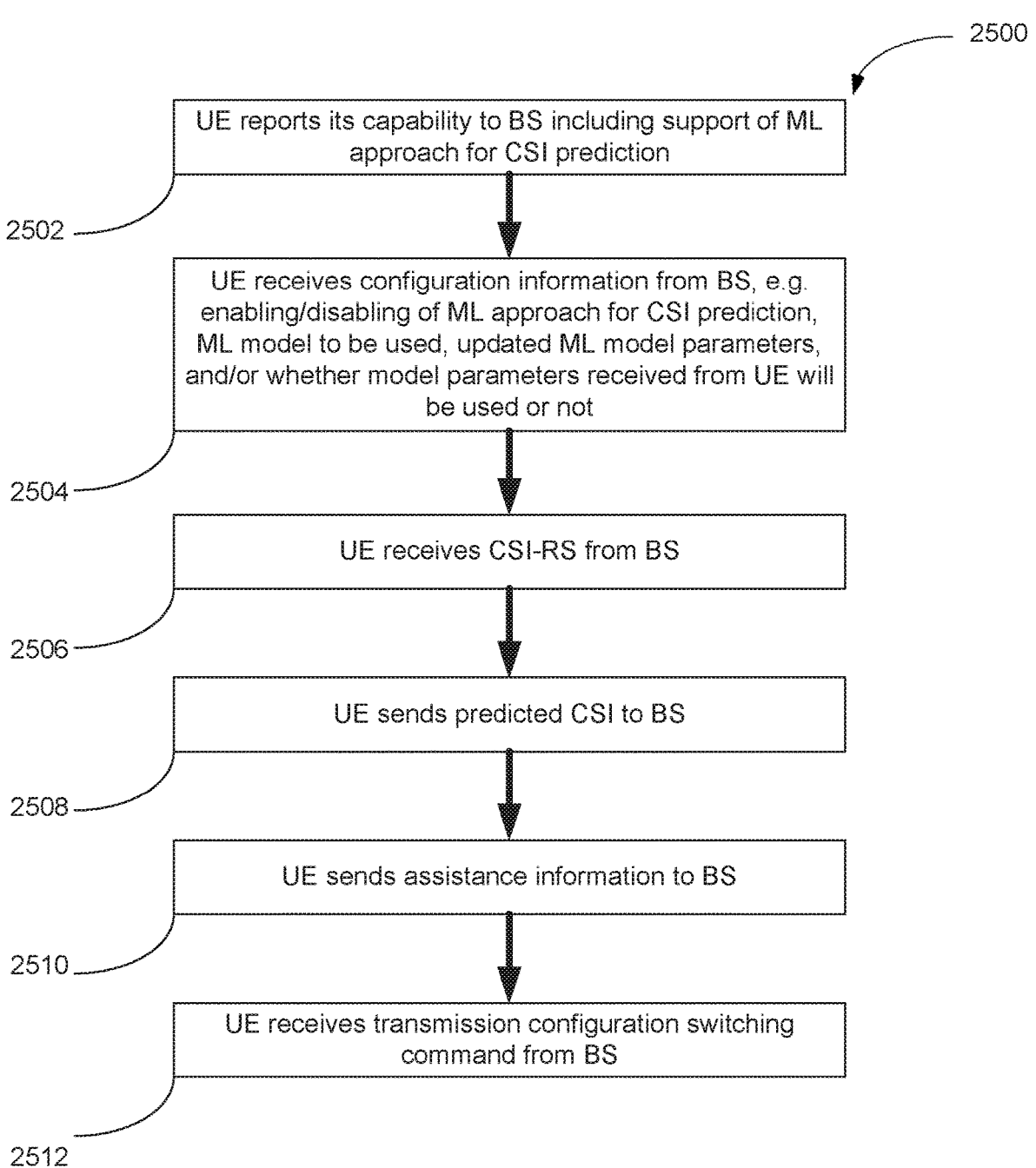

2500

2502 — UE reports its capability to BS including support of ML approach for CSI prediction 2504 — UE receives configuration information from BS, e.g. enabling/disabling of ML approach for CSI prediction, ML model to be used, updated ML model parameters, and/or whether model parameters received from UE will be used or not 2506 — UE receives CSI-RS from BS 2508 — UE sends predicted CSI to BS 2510 — UE sends assistance information to BS 2512 — UE receives transmission configuration switching command from BS

METHOD AND APPARATUS FOR CSI REPORT CONFIGURATION FOR CSI PREDICTIONS IN ONE OR MORE DOMAINS

CROSS-REFERENCE TO RELATED APPLICATION AND CLAIM OF PRIORITY

This application claims priority under 35 U.S.C. § 119(e) to U.S. Provisional Patent Application No. 63/332,579 filed on Apr. 19, 2022, U.S. Provisional Patent Application No. 63/388,368 filed on Jul. 12, 2022, and U.S. Provisional Patent Application No. 63/393,115 filed on Jul. 28, 2022. The above-identified provisional patent applications are hereby incorporated by reference in their entirety.

TECHNICAL FIELD

The present disclosure relates generally to wireless communication systems and, more specifically, to a method and apparatus for channel state information (CSI) report configuration for CSI predictions in one or more domains.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for CSI report configuration for CSI predictions in one or more domains.

In one embodiment, a user equipment (UE) is provided. The UE includes a transceiver configured to transmit capability information indicating capability of the UE to support machine learning (ML) based channel state information (CSI) prediction in one or more domains, receive configuration information that indicates parameters for ML based CSI prediction in the one or more domains, and receive CSI reference signals (RSs). The UE further includes a processor operably coupled to the transceiver. The processor is configured to measure the CSI-RSs, determine, based on the configuration information and the measured CSI-RSs, a plurality of CSI predictions in the one or more domains, and determine a CSI report including one or more of the plurality of CSI predictions and dependency information indicating dependencies between CSI predictions in the plurality of CSI predictions. The transceiver is further configured to transmit the CSI report.

In another embodiment, a base station (BS) is provided. The BS includes a transceiver configured to receive, from a UE, capability information indicating capability of the UE to support ML based CSI prediction in one or more domains, transmit configuration information that indicates parameters for ML based CSI prediction in the one or more domains, transmit CSI RSs, and receive a CSI report including one or more CSI predictions and dependency information indicating dependencies between CSI predictions of a plurality of CSI predictions including the one or more CSI predictions. The plurality of CSI predictions is based on the configuration information and the CSI-RSs.

In yet another embodiment, a method performed by a UE is provided. The method includes transmitting capability information indicating capability of the UE to support ML based CSI prediction in one or more domains, receiving configuration information that indicates parameters for ML based CSI prediction in the one or more domains; receiving CSI RSs, and measuring the CSI-RSs. The method further includes determining, based on the configuration information and the measured CSI-RSs, a plurality of CSI predictions in the one or more domains; determining a CSI report including one or more of the plurality of CSI predictions and dependency information indicating dependencies between CSI predictions in the plurality of CSI predictions; and transmitting the CSI report.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example method for operations at a UE to support multi-frequency CSI reports according to embodiments of the present disclosure;

FIG. 10 illustrates a method for operations at a BS to support multi-frequency CSI-based BWP switching according to embodiments of the present disclosure;

FIG. 12 illustrates a method for operations at a BS to support DMRS-based multi-frequency CSI reports according to embodiments of the present disclosure;

FIG. 18 illustrates a method for operations at a BS to support techniques for differential CSI prediction according to embodiments of the disclosure;

FIG. 20 illustrates a method for operations at a BS to support UE-initiated disabling of differential CSI prediction according to embodiments of the disclosure;

FIG. 22 illustrates a method for operations at a BS to support BS-initiated disabling of differential CSI prediction according to embodiments of the disclosure;

FIG. 24 illustrates a method for operations at a BS to support transmission configuration switching according to embodiments of the disclosure;

FIG. 25 illustrates a method for operations at a UE to support AI/ML techniques for transmission configuration switching according to embodiments of the disclosure;

DETAILED DESCRIPTION

Figure 1:
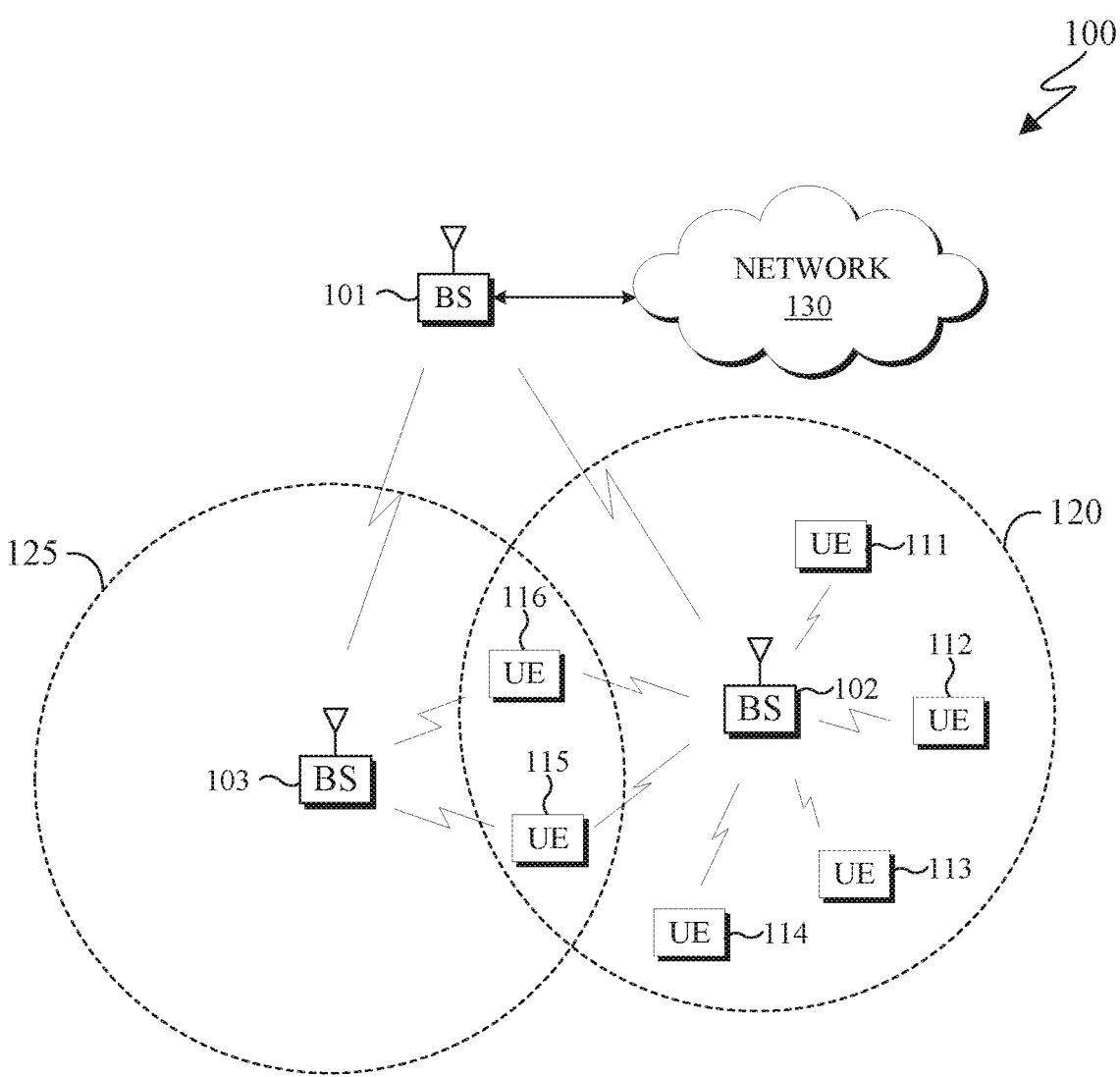
FIG. 1 illustrates an example wireless network according to embodiments of the present disclosure.

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.1.0, "NR; Physical channels and modulation;" 3GPP TS 38.331 v17.0.0, "NR; Radio Resource Control (RRC) Protocol Specification"; 3GPP TS 38.321 v17.0.0, "NR; Medium Access Control (MAC); Protocol Specification; 3GPP TS 38.212 v17.1.0, "E-UTRA, NR, Multiplexing and Channel coding"; 3GPP, TS 38.214, v17.1.0, "NR; Physical Layer Procedures for Data"; and Y. Zhou and K. Hauser, "Incorporating side-channel information into convolutional neural networks for robotic tasks".

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
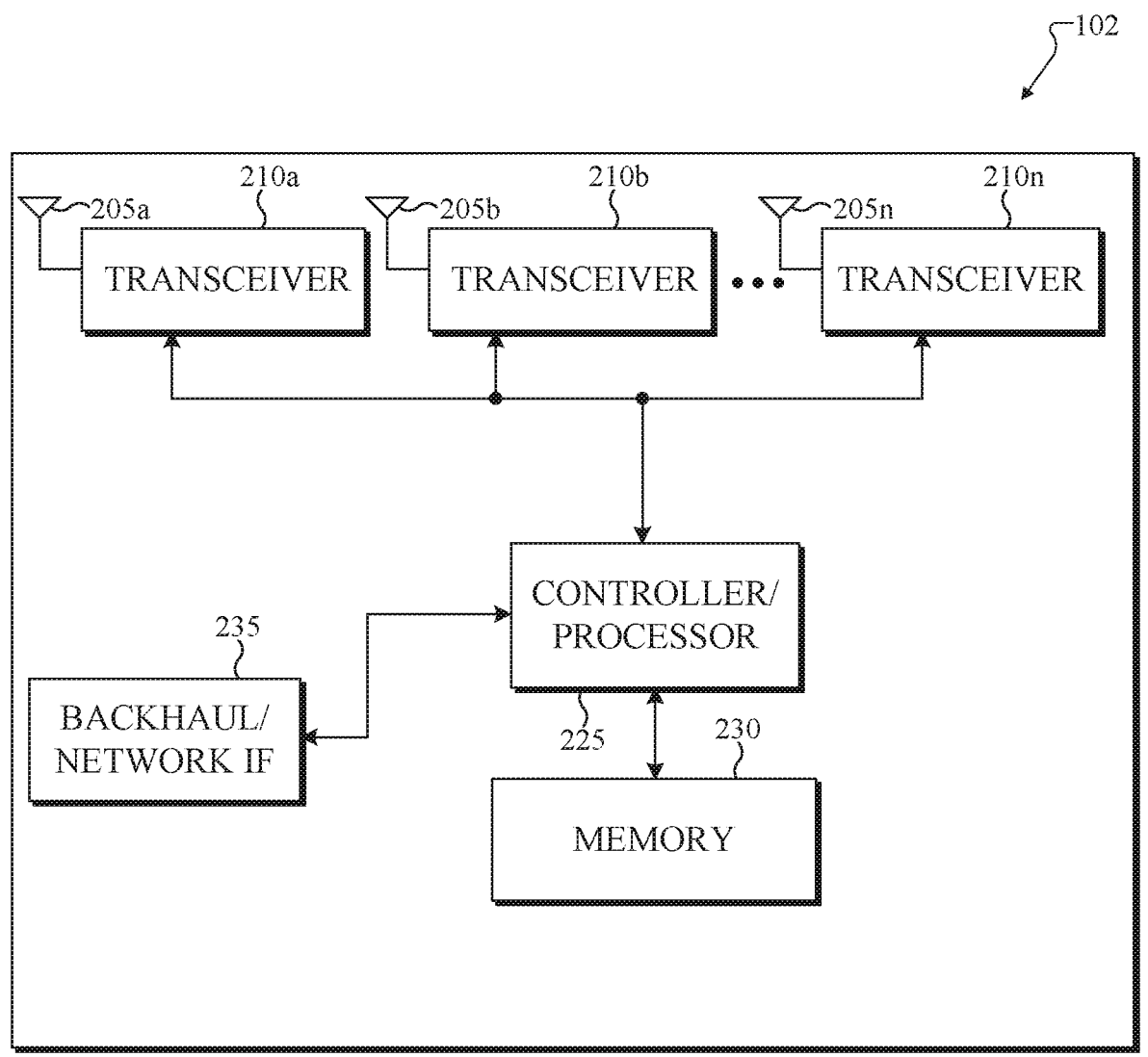
FIG. 2 illustrates an example gNodeB (gNB) according to embodiments of the present disclosure.
Figure 3:
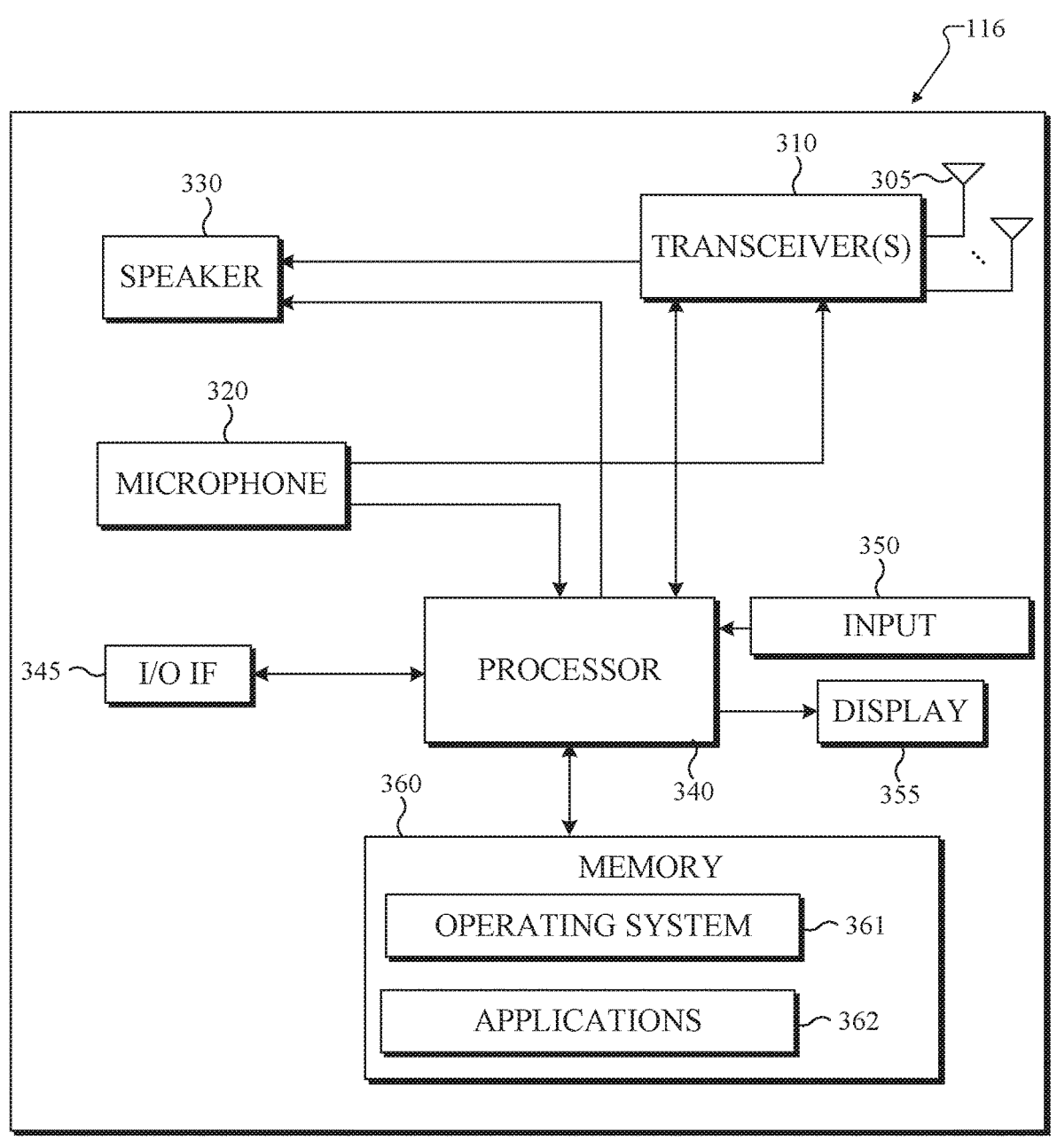
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network 100 according to this disclosure. The embodiment of the wireless network 100 shown in FIG. 1 is for illustration only. Other embodiments of the wireless network 100 can be used without departing from the scope of this disclosure.

The wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115, the UE 116, UE 117 and UE 118. In some embodiments, one or more of the gNBs 101-103 may communicate with each other and with the UEs 111-118 using 5G, long-term evolution (LTE), LTE-A, WiMAX, or other advanced wireless communication techniques. In some embodiments, multiple UEs, e.g., UE 117, UE 118 and UE 119 may communicate directly with each other through device-2-device communication. In some embodiments, a UE, e.g., UE 119, is outside the coverage area of the network, but can communicate with other UEs inside the coverage area of the network, e.g., UE 118, or outside the coverage area of the network.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 can include any number of gNBs and any number of UEs in any suitable arrangement. Also, the gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

As described in more detail below, one or more of the UEs 111-116 include circuitry, programing, or a combination thereof for supporting CSI report configuration for CSI predictions in one or more domains. In certain embodiments, one or more of the gNBs 101-103 include circuitry, programing, or a combination thereof for supporting CSI report configuration for CSI predictions in one or more domains.

FIG. 2 illustrates an example gNB 102 according to this disclosure. The embodiment of the gNB 102 shown in FIG. 2 is for illustration only, and other gNBs of FIG. 1 can have the same or similar configuration. However, gNBs come in a wide variety of configurations, and FIG. 2 does not limit the scope of this disclosure to any particular implementation of an gNB. It is noted that gNB 101 and gNB 103 can include the same or similar structure as gNB 102.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for CSI report configuration for CSI predictions in one or more domains. Any of a wide variety of other functions could be supported in the gNB 102 by the controller/processor 225.

The controller/processor 225 is also capable of executing programs and other processes resident in the memory 230, such as processes for a CSI report configuration for CSI predictions in one or more domains. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a CSI report configuration for CSI predictions in one or more domains. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
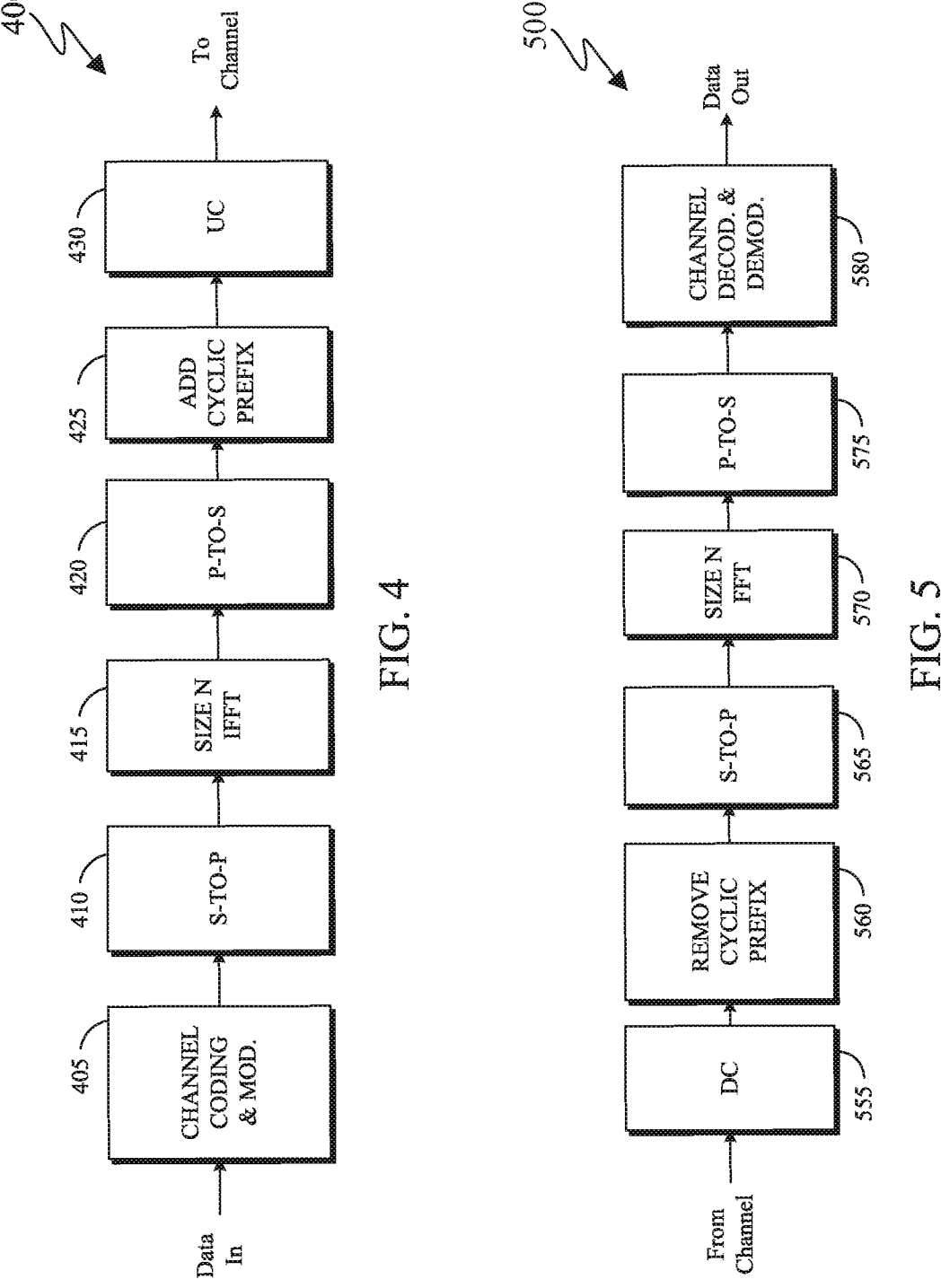
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a gNB (such as the gNB 102), while a receive path 500, of FIG. 5, may be described as being implemented in a UE (such as a UE 116). However, it may be understood that the receive path 500 can be implemented in a gNB and that the transmit path 400 can be implemented in a UE. Furthermore, it will be understood that the receive path 500 can be implemented in one UE, and that the transmit path 400 can be implemented in another UE in case of device-2-device communication.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal.

The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the gNB s 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In 5G NR, several types of RS have been defined. For example, CSI-RS is used for DL communication between a gNB and a UE, where the UE uses received CSI-RS to measure DL CSI and report those measurements to the gNB. Also, DMRS is used by a receiver (either for DL or UL communications) to estimate CSI; this estimate is used to demodulate received data.

Before a gNB transmits CSI-RS to a UE, it sends the UE a CSI report configuration message. This report configuration message includes information such as the time-frequency positions of transmitted CSI-RS, the types of CSI that can be included in the CSI report, and the reporting periodicity.

It may be advantageous to configure the UE to report CSI for frequencies where CSI-RS is not transmitted. For example, if the UE reports that DL CSI on one SB B is better than DL CSI on another SB A where a gNB has sent CSI-RS, then improved performance can result from configuring a PDSCH transmission on SB B. As another example, if the UE reports that DL CSI on an inactive BWP B is better than DL CSI on an active BWP A, then improved performance can result from switching to BWP B.

The present disclosure describes a framework for supporting AI/ML techniques for enabling multi-frequency CSI reports. The corresponding signaling details are discussed in this disclosure.

Various embodiments of the present disclosure recognize the issue that multi-frequency CSI reports are not supported in the 5G-NR standard. Accordingly, various embodiments of the present disclosure provide methods that the network can use to configure a UE to transmit multi-frequency CSI reports using AI/ML-based solutions. In addition, various embodiments of the present disclosure provide a framework for switching BWPs and/or SBs based on UE inference and information. Further, various embodiments of the present disclosure provide details on the support of AI/ML techniques for enabling multi-frequency CSI reports, including information elements to be exchanged between a transmitter and a receiver.

Various embodiments of the present disclosure recognize that in 5G NR, a significant improvement in throughput can be obtained by supporting MU-MIMO transmission, where one gNB simultaneously transmits multiple data streams to multiple UEs. MU-MIMO transmission relies on the availability of accurate DL CSI at the gNB; in FDD systems, each UE measures DL CSI and reports its measurements. Each CSI report can include PMI (the dominant channel directions), RI (the number of dominant channel directions), and/or CQI (the best modulation and code rate that the channel can support).

Various embodiments of the present disclosure recognize that the accuracy of reported measurements of DL CSI degrades with UE mobility (e.g., pedestrian walking speeds), though. When outdated DL CSI is used to determine the DL precoding vectors for MU-MIMO transmission, MU interference occurs, leading to significant degradation in UPT.

Various embodiments of the present disclosure recognize that it may be advantageous to configure the UE to report predictions of CSI for future time instances. For example, at time slot N, if the UE reports a prediction of CSI at a future time slot N+T, then improved UPT can result from the gNB applying this CSI prediction to determine the DL precoding vectors at time slot N+T. As another example, a gNB can configure a UE to compute the difference between consecutive CSI observations and use these differences as inputs to a CSI predictor. In addition, various embodiments of the present disclosure recognize the issue that AI/ML-based techniques for generating/reporting CSI predictions are not supported in the 5G-NR standard.

Accordingly, various embodiments of the present disclosure describe a framework for supporting AI/ML techniques for CSI prediction. The corresponding signaling details are discussed in this disclosure. In addition, various embodiments of the present disclosure provide techniques that the network can use to configure a UE to generate CSI predictions using AI/ML-based techniques. Further, various embodiments of the present disclosure provide details on the support of AI/ML techniques for generating CSI predictions, including information elements to be exchanged between a transmitter and a receiver.

Figure 6:
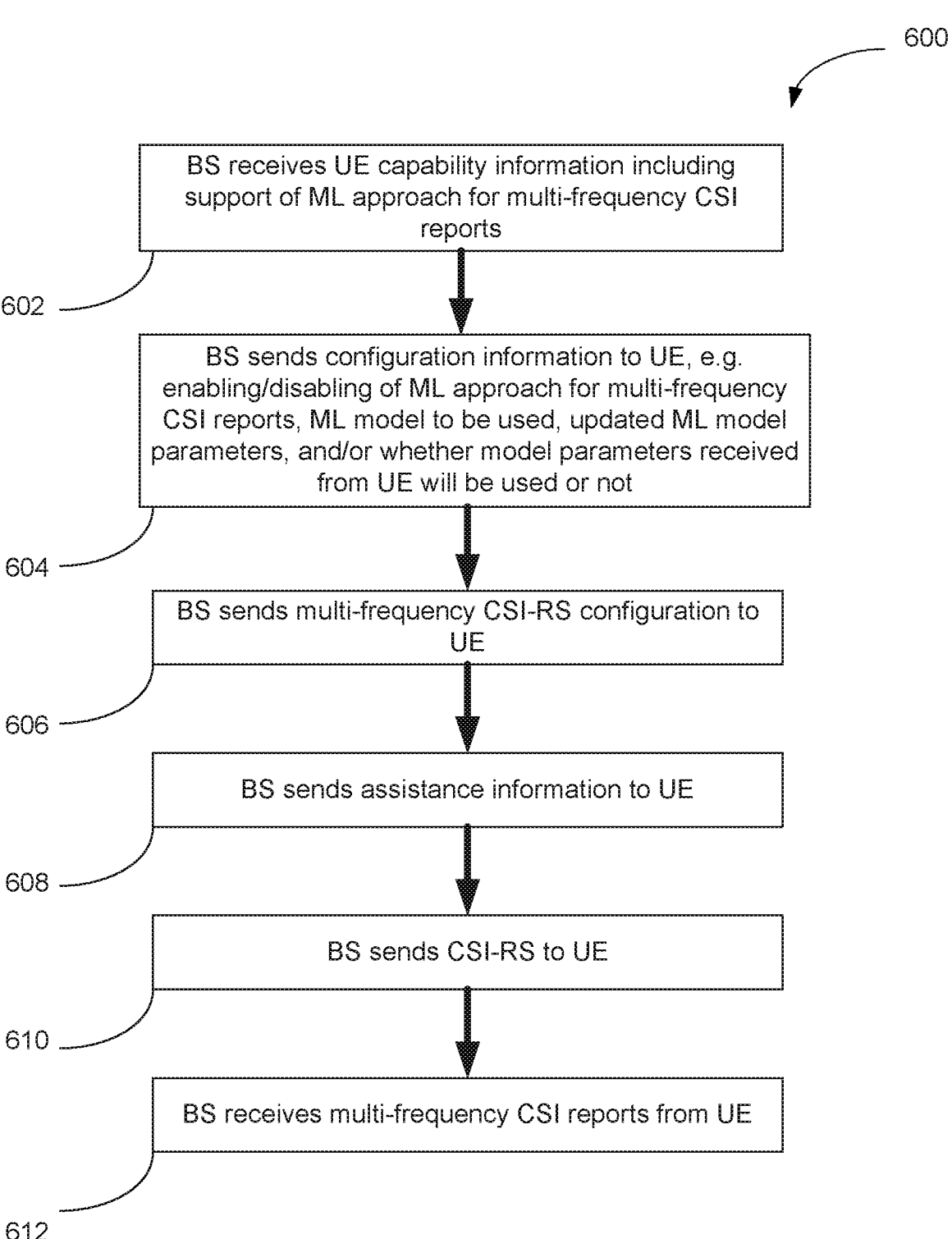
FIG. 6 illustrates an example method for operations at a BS to support multi-frequency CSI reports according to embodiments of the present disclosure.

FIG. 6 illustrates an example method 600 for operations at a BS to support multi-frequency CSI reports according to embodiments of the present disclosure. The embodiment of the method 600 for operations at a BS to support multi-frequency CSI reports in FIG. 6 is for illustration only. FIG. 6 does not limit the scope of this disclosure to any particular implementation of the method 600 for operations at a BS to support for multi-frequency CSI reports.

As illustrated in FIG. 6, the method 600 begins at step 602, where a BS (such as the BS 102) receives UE capability information from a UE, including the support of an ML approach for multi-frequency CSI reports. At step 604, the BS sends configuration information to a UE, which can include ML-related configuration information or parameters for the UE to use such as enabling/disabling of an ML approach for multi-frequency CSI reports, an ML model to be used, trained model parameters, and/or whether model parameter updates reported by the UE will be used or not. At step 606, the BS sends a multi-frequency CSI-RS configuration message to the UE. In one example, this message can correspond to two SBs A and B. At step 608, the BS sends assistance information to a UE; the assistance information can include beamforming information, which will be described in the "BS assistance information" section. At step 610, the BS sends CSI-RS to the UE. In one example, the CSI-RS can be sent on SB A. In another example, the CSI-RS can be sent on SB B. In another example, the CSI-RS can be sent on SB A and SB B. At step 612, the BS receives multi-frequency CSI reports from the UE. In one example, these reports can correspond to SBs A and B. In another example, these reports can include a full CSI report for SB A (or SB B) and a differential CSI report for SB B (or SB A), where the BS can combine both of these CSI reports to obtain a full CSI report for SB B. In one example, a CQI (channel quality indicator) for SB B (or SB A) can be computed in a differential manner, based on CQI for SB A (or SB B). In another example, a PMI (precoding matrix indicator) for SB B (or SB A) can depend on the PMI for SB A (or SB B). In various embodiments, the CSI predictions and reports may be in one or more domains including, spatial, temporal (or time), and/or frequency domains. For example, a spatial domain (SD) basis matrix is the (or partially) same for the CSI of SB A and B, and a frequency domain (FD) basis matrix is the (or partially) same for the CSI of SB A and B. In another example, either the SD basis or FD basis matrix is the (or partially) same for the CSI of SB A and B. In another example, both are separately selected for the CSI of SB A and SB B, respectively. In another example, a RI (rank indicator) can be separately selected or commonly selected.

In various embodiments, the CSI predictions and reports may be in one or more domains including, spatial, temporal (or time), and/or frequency domains. In various embodiments, one or more of the CSI predictions and/or reports may reference and or depend on another one of the CSI predictions and/or reports (e.g., be reported differently to the other one or be predicted as a function of the other prediction or report). The UE may further report dependency information in the CSI report to indicate the dependency between the CSI predictions and/or reports. For example, this dependency information may indicate the time or frequency information of one prediction or report relative to another. In another example, the dependency information may indicate a weighting or scaling factor to be applied to certain parameters of the prediction or report. In another example, the dependency information may indicate to which of the other predictions or reports a differentially or dependently reported prediction or report refers or depends.

FIG. 7 illustrates an example method 700 for operations at a UE to support multi-frequency CSI reports according to embodiments of the present disclosure. The embodiment of the method 700 for operations at a UE to support multi-frequency CSI reports in FIG. 7 is for illustration only. FIG. 7 does not limit the scope of this disclosure to any particular implementation of the method 700 for operations at a BS to support multi-frequency CSI reports.

As illustrated in FIG. 7, the method 700 begins at step 702, where a UE (such as the UE 116) reports capability information to a BS, including the support of an ML approach for multi-frequency CSI reports. At step 704, the UE receives configuration information from a BS, which can include ML-related configuration information such as enabling/disabling of an ML approach for multi-frequency CSI reports, an ML model to be used, trained model parameters, and/or whether model parameter updates reported by a UE will be used or not. At step 706, the UE receives a multi-frequency CSI-RS configuration message from a BS. In one example, this message can correspond to two SBs A and B. At step 708, the UE receives assistance information from a BS; the assistance information can include beamforming information, which will be described in the "BS assistance information" section. At step 710, the UE receives CSI-RS from the BS. In one example, the CSI-RS can be received on SB A. In another example, the CSI-RS can be received on SB B. In another example, the CSI-RS can be received on SB A and SB B. At step 712, the UE sends multi-frequency CSI reports to the BS. In one example, these reports can correspond to SBs A and B. In another example, these reports can include a full CSI report for SB A (or SB B) and a differential CSI report for SB B (or SB A), where a BS can use both of these CSI reports to obtain a full CSI report for SB B. In one example, a CQI (channel quality indicator) for SB B (or SB A) can be computed in a differential manner, based on the CQI for SB A (or SB B). In another example, a PMI (precoding matrix indicator) for SB B (or SB A) can depend on the PMI for SB A (or SB B). For example, a spatial domain (SD) basis matrix is the (or partially) same for the CSI of SB A and B, and a frequency domain (FD) basis matrix is the (or partially) same for the CSI of SB A and B. In another example, either the SD basis or FD basis matrix is the (or partially) same for the CSI of SB A and B. In another example, both are separately selected for the CSI of SB A and SB B, respectively. In another example, a RI (rank indicator) can be separately selected or commonly selected.

Figure 8:
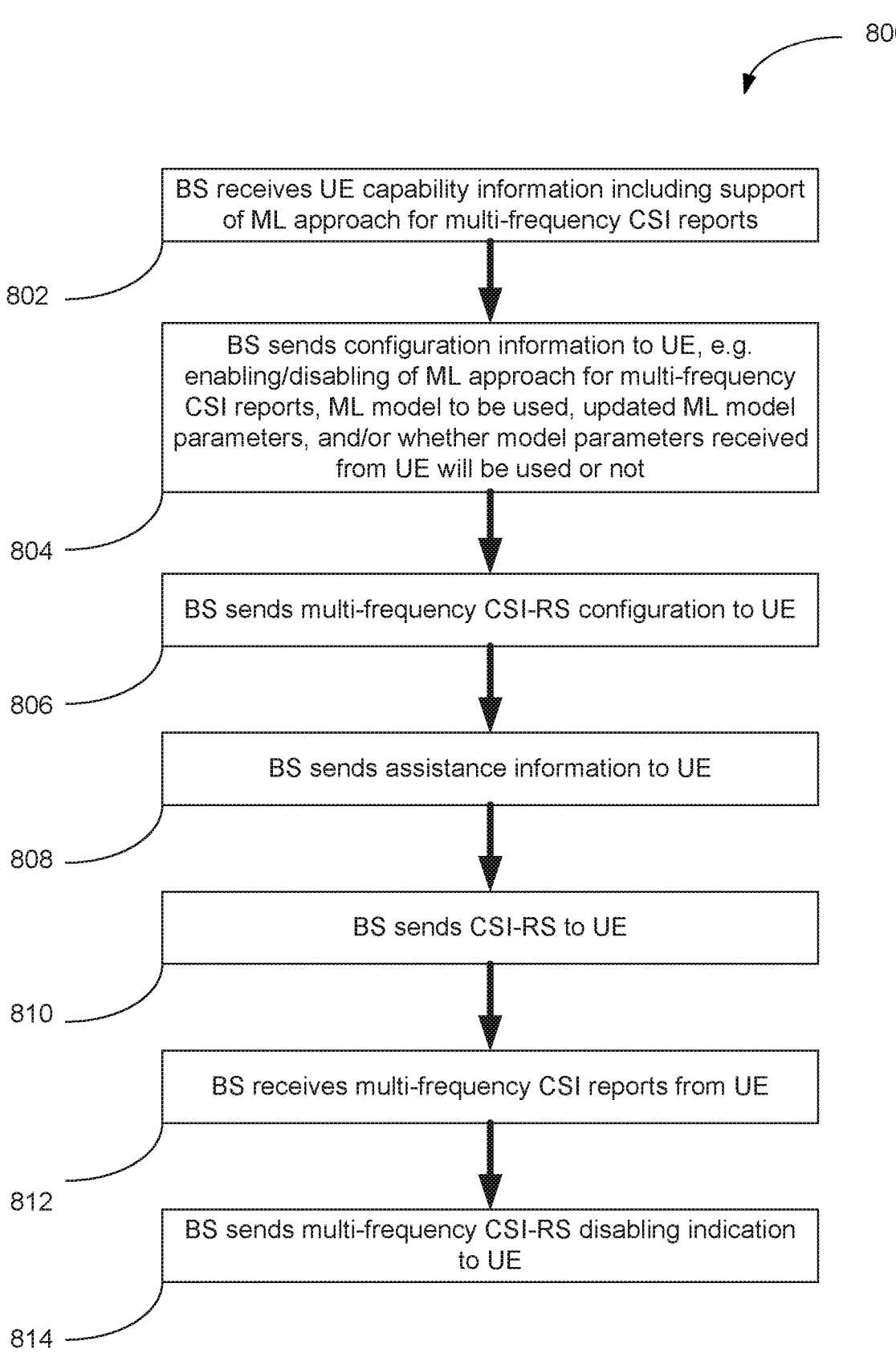
FIG. 8 illustrates a method for operations at a BS to support disabling of multi-frequency CSI reports according to embodiments of the disclosure.

FIG. 8 illustrates a method 800 for operations at a BS to support disabling of multi-frequency CSI reports according to embodiments of the disclosure. The embodiment of the method 800 for operations at a BS to support disabling of multi-frequency CSI reports in FIG. 8 is for illustration only. FIG. 8 does not limit the scope of this disclosure to any particular implementation of the method 800 for operations at a BS to support disabling of multi-frequency CSI reports.

As illustrated in FIG. 8, the method 800 begins at step 802, where a BS (such as the BS 102) receives UE capability information from a UE, including the support of an ML approach for multi-frequency CSI reports. At step 804, the BS sends configuration information to the UE, which can include ML-related configuration information such as enabling/disabling of an ML approach for multi-frequency CSI reports, an ML model to be used, trained model parameters, and/or whether model parameter updates reported by a UE will be used or not. At step 806, the BS sends a multi-frequency CSI-RS configuration message to a UE. In one example, this message can correspond to two SBs A and B. At step 808, the BS sends assistance information to the UE; the assistance information can include beamforming information, which will be described in the "BS assistance information" section. At step 810, the BS sends a CSI-RS to a UE. In one example, the CSI-RS can be sent on SB A. In another example, the CSI-RS can be sent on SB B. In another example, the CSI-RS can be sent on SB A and SB B. At step 812, the BS receives multi-frequency CSI reports from the UE. In one example, these reports can correspond to SBs A and B. In another example, these reports can include a full CSI report for SB A (or SB B) and a differential CSI report for SB B (or SB A), where the BS can combine both of these CSI reports to obtain a full CSI report for SB B. In one example, a CQI (channel quality indicator) for SB B (or SB A) can be computed in a differential manner, based on the CQI for SB A (or SB B). In another example, a PMI (precoding matrix indicator) for SB B (or SB A) can depend on the PMI for SB A (or SB B). For example, a spatial domain (SD) basis matrix is the (or partially) same for the CSI of SB A and B, and a frequency domain (FD) basis matrix is the (or partially) same for the CSI of SB A and B. In another example, either the SD basis or FD basis matrix is the (or partially) same for the CSI of SB A and B. In another example, both are separately selected for the CSI of the SB A and SB B, respectively. In another example, a RI (rank indicator) can be separately selected or commonly selected. At step 814, a BS sends a multi-frequency CSI-RS disabling indication to the UE. In one example, this message can disable CSI reports for SB B (or SB A).

Figure 9:
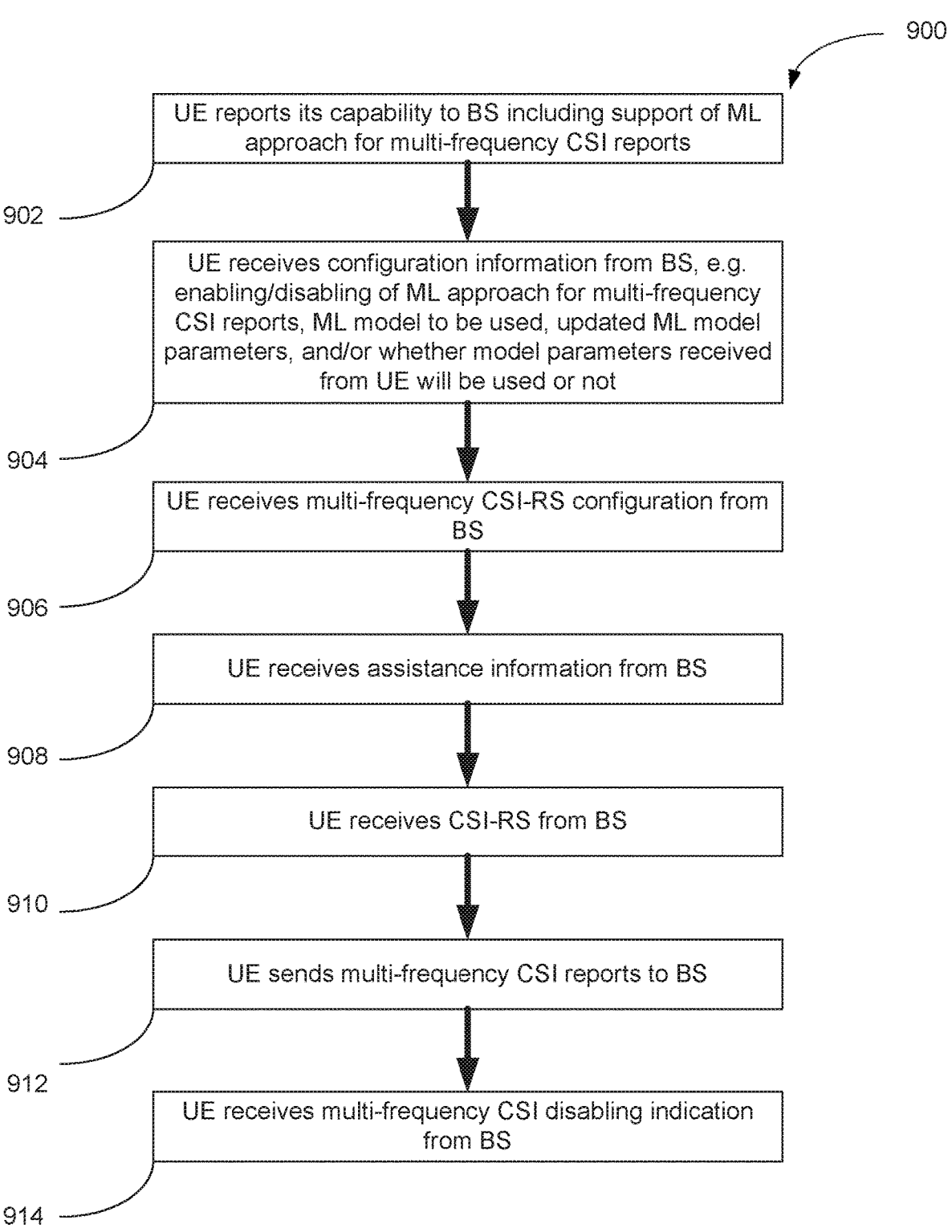
FIG. 9 illustrates a method for operations at a UE to support disabling of multi-frequency CSI reports according to embodiments of the disclosure.

FIG. 9 illustrates a method 900 for operations at a UE to support disabling of multi-frequency CSI reports according to embodiments of the disclosure. The embodiment of the method 900 for operations at a UE to support disabling of multi-frequency CSI reports in FIG. 9 is for illustration only. FIG. 9 does not limit the scope of this disclosure to any particular implementation of the method 900 for operations at a UE to support disabling of multi-frequency CSI reports.

As illustrated in FIG. 9, the method 900 begins at step 902, where a UE (such as the UE 116) reports capability information to a BS, including the support of an ML approach for multi-frequency CSI reports. At step 904, the UE receives configuration information from a BS, which can include ML-related configuration information such as enabling/disabling of an ML approach for multi-frequency CSI reports, an ML model to be used, trained model parameters, and/or whether model parameter updates reported by a UE will be used or not. At step 806, the UE receives a multi-frequency CSI-RS configuration message from a BS. In one example, this message can correspond to two SBs A and B. At step 808, the UE receives assistance information from the BS; the assistance information can include beamforming information, which will be described in the "BS assistance information" section. At step 810, the UE receives a CSI-RS from the BS. In one example, the CSI-RS can be received on SB A. In another example, the CSI-RS can be received on SB B. In another example, the CSI-RS can be received on SB A and SB B. At operation 912, the UE sends multi-frequency CSI reports to the BS. In one example, these reports can correspond to SBs A and B. In another example, these reports can include a full CSI report for SB A (or SB B) and a differential CSI report for SB B (or SB A), where the BS can combine both of these CSI reports to obtain a full CSI report for SB B. In one example, a CQI (channel quality indicator) for SB B (or SB A) can be computed in a differential manner, based on the CQI for SB A (or SB B). In another example, a PMI (precoding matrix indicator) for SB B (or SB A) can depend on PMI for SB A (or SB B). For example, a spatial domain (SD) basis matrix is the (or partially) same for the CSI of SB A and B, and a frequency domain (FD) basis matrix is the (or partially) same for the CSI of SB A and B. In another example, either the SD basis or FD basis matrix is the (or partially) same for the CSI of SB A and B. In another example, both are separately selected for the CSI of SB A and SB B, respectively. In another example, a RI (rank indicator) can be separately selected or commonly selected. At step 914, the UE receives a multi-frequency CSI-RS disabling indication from a BS. In one example, this message can disable CSI reports for SB B.

FIG. 10 illustrates a method 1000 for operations at a BS to support multi-frequency CSI-based BWP switching according to embodiments of the present disclosure. The embodiment of the method 1000 for operations at a BS to support multi-frequency CSI-based BWP switching in FIG. 10 is for illustration only. FIG. 10 does not limit the scope of this disclosure to any particular implementation of the method 1000 for operations at a BS to support multi-frequency CSI-based BWP switching.

The method 1000 begins at step 1002, where a BS (such as the BS 102) receives UE capability information from a UE, including the support of an ML approach for multi-frequency CSI-based BWP switching. At step 1004, the BS sends configuration information to a UE, which can include ML-related configuration information such as enabling/disabling of an ML approach for multi-frequency CSI-based BWP switching, an ML model to be used, trained model parameters, and/or whether model parameter updates reported by a UE will be used or not. At step 1006, the BS sends a multi-frequency CSI-RS configuration message to the UE for an active BWP A and an inactive BWP B. At step 1008, the BS sends assistance information to a UE; the assistance information can include beamforming information, which will be described in the "BS assistance information" section. At step 1010, the BS sends a CSI-RS to the UE on BWP A. At step 1012, the BS receives multi-frequency CSI reports from the UE for BWP A and BWP B. In one example, these reports can include a full CSI report for BWP A and a differential CSI report for BWP B, where the BS can combine both of these CSI reports to obtain a full CSI report for BWP B. In one example, a CQI (channel quality indicator) for BWP B can be computed in a differential manner, based on the CQI for BWP A. In another example, a PMI (precoding matrix indicator) for BWP B can depend on PMI for BWP A. For example, a spatial domain (SD) basis matrix is the (or partially) same for the CSI of BWP A and B, and a frequency domain (FD) basis matrix is the (or partially) same for the CSI of BWP A and B. In another example, either the SD basis or FD basis matrix is the (or partially) same for the CSI of BWP A and B. In another example, both are separately selected for the CSI of BWP A and BWP B, respectively. In another example, an RI (rank indicator) can be separately selected or commonly selected. At step 1014, the BS receives assistance information from the UE; the assistance information can include a recommendation for BWP switching, which will be described in the "UE assistance information" section. At step 1016, the BS sends a BWP switching command message to the UE. In one example, this message can correspond to a BWP switch from BWP A to BWP B.

Figure 11:
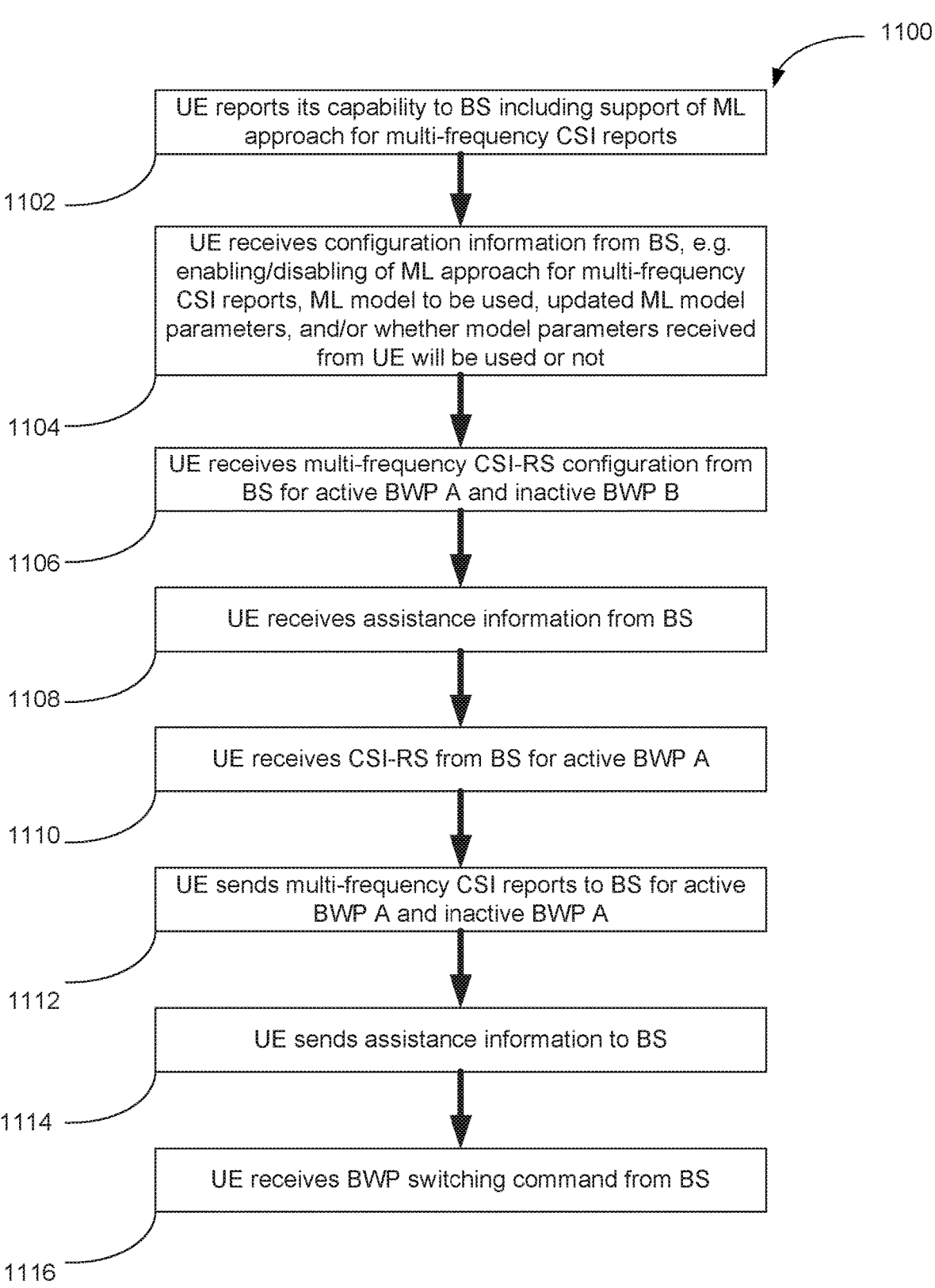
FIG. 11 illustrates a method for operations at a UE to support multi-frequency CSI-based BWP switching according to embodiments of the present disclosure.

FIG. 11 illustrates a method 1100 for operations at a UE to support multi-frequency CSI-based BWP switching according to embodiments of the present disclosure. The embodiment of the method 1100 for operations at a BS to support multi-frequency CSI-based BWP switching in FIG. 11 is for illustration only. FIG. 11 does not limit the scope of this disclosure to any particular implementation of the method 1100 for operations at a BS to support multi-frequency CSI-based BWP switching.

As illustrated in FIG. 11, the method begins at step 1102, where a UE (such as the UE 116) reports capability information to a BS, including the support of an ML approach for multi-frequency CSI-based BWP switching. At step 1104, the UE receives configuration information from the BS, which can include ML-related configuration information such as enabling/disabling of an ML approach for multi-frequency CSI-based BWP switching, an ML model to be used, trained model parameters, and/or whether model parameter updates reported by a UE will be used or not. At step 1106, the UE receives a multi-frequency CSI-RS configuration message from the BS for an active BWP A and an inactive BWP B. At step 1108, the UE receives assistance information from the BS; the assistance information can include beamforming information, which will be described in the "BS assistance information" section. At step 1110, the UE receives a CSI-RS from the BS on BWP A. At step 1112, the UE sends multi-frequency CSI reports to the BS for BWP A and BWP B. In one example, this message can include a full CSI report for BWP A and a differential CSI report for BWP B, where the BS can combine both of these CSI reports to obtain a full CSI report for BWP B. In one example, a CQI (channel quality indicator) for BWP B can be computed in a differential manner, based on CQI for BWP A. In another example, a PMI (precoding matrix indicator) for BWP B can depend on PMI for BWP A. For example, a spatial domain (SD) basis matrix is the (or partially) same for the CSI of BWP A and B, and a frequency domain (FD) basis matrix is the (or partially) same for the CSI of BWP A and B. In another example, either the SD basis or FD basis matrix is the (or partially) same for the CSI of BWP A and B. In another example, both are separately selected for the CSI of BWP A and BWP B, respectively. At step 1114, the UE sends assistance information to a BS; the assistance information can include a recommendation for BWP switching, which will be described in the "UE assistance information" section. At step 1116, the UE receives a BWP switching command message from the BS. In one example, this message can correspond to a BWP switch from BWP A to BWP B.

FIG. 12 illustrates an example of a method 1200 for operations at a BS to support DMRS-based multi-frequency CSI reports according to embodiments of the present disclosure. The embodiment of the method 1200 for operations at a BS to support DMRS-based multi-frequency CSI reports in FIG. 12 is for illustration only. FIG. 12 does not limit the scope of this disclosure to any particular implementation of the method 1200 for operations at a BS to support DMRS-based multi-frequency CSI reports.

As illustrated in FIG. 12, the method 1200 begins at step 1202, where a BS (such as the BS 102) receives UE capability information from a UE, including the support of an ML approach for DMRS-based multi-frequency CSI reports. At step 1204, the BS sends configuration information to a UE, which can include ML-related configuration information such as enabling/disabling of an ML approach for DMRS-based multi-frequency CSI reports, an ML model to be used, trained model parameters, and/or whether model parameter updates reported by a UE will be used or not. At step 1206, the BS sends a DMRS configuration message to the UE for an SB A (or SB B) that includes a CSI-RS configuration message for an SB B (or SB A). At step 1208, the BS sends assistance information to the UE; the assistance information can include beamforming information, which will be described in the "BS assistance information" section. At step 1210, the BS sends DMRS to the UE for SB A (or SB B). At step 1212, the BS receives CSI reports from the UE for SB B (or SB A). At operation 1214, the BS receives assistance information from the UE; the assistance information can include a recommendation for SB switching, which will be described in the "UE assistance information" section. At step 1216, the BS sends a DMRS configuration message to the UE for an SB B (or SB A).

In one embodiment, a BS can configure a UE to send multi-frequency CSI reports via RRC configuration. Table 1 illustrates an example of modifying an IE CSI-ReportConfig to configure a UE to send multi-frequency CSI reports. In this example, CSI-RS will be transmitted on the CSI resources that are included in resourcesForChannelMeasurement, and the UE is configured to send CSI reports for those resources. CSI-RS will not be transmitted on the CSI resources that are included in additionalChannelMeasurementResourcesWithoutCSIRS (if present); the UE is configured to also send CSI reports for those resources. In another example, a new DCI format can be defined to support multi-frequency CSI reports. This DCI format can include an indication of additional frequencies that the UE can measure, where the UE can include those measurement results in their corresponding CSI reports. CSI-RS will not be transmitted on those additional frequencies.

TABLE 1

| An Example of IE CSI-ReportConfig modification to configure multi-frequency CSI reports |
|---|

```
CSI-ReportConfig ::= SEQUENCE {
    reportConfigId                                      CSI-ReportConfigId
    carrier                              ServCellIndex          OPTIONAL, -- Need S
    resourcesForChannelMeasurement                     CSI-ResourceConfigId
    additionalChannelMeasurementResourcesWithoutCSIRS   CSI-ResourceConfigId
        OPTIONAL, -- Need R
    csi-IM-ResourcesForInterference                    CSI-ResourceConfigId OPTIONAL, --
Need R
    ...,
}
```

Figure 13:
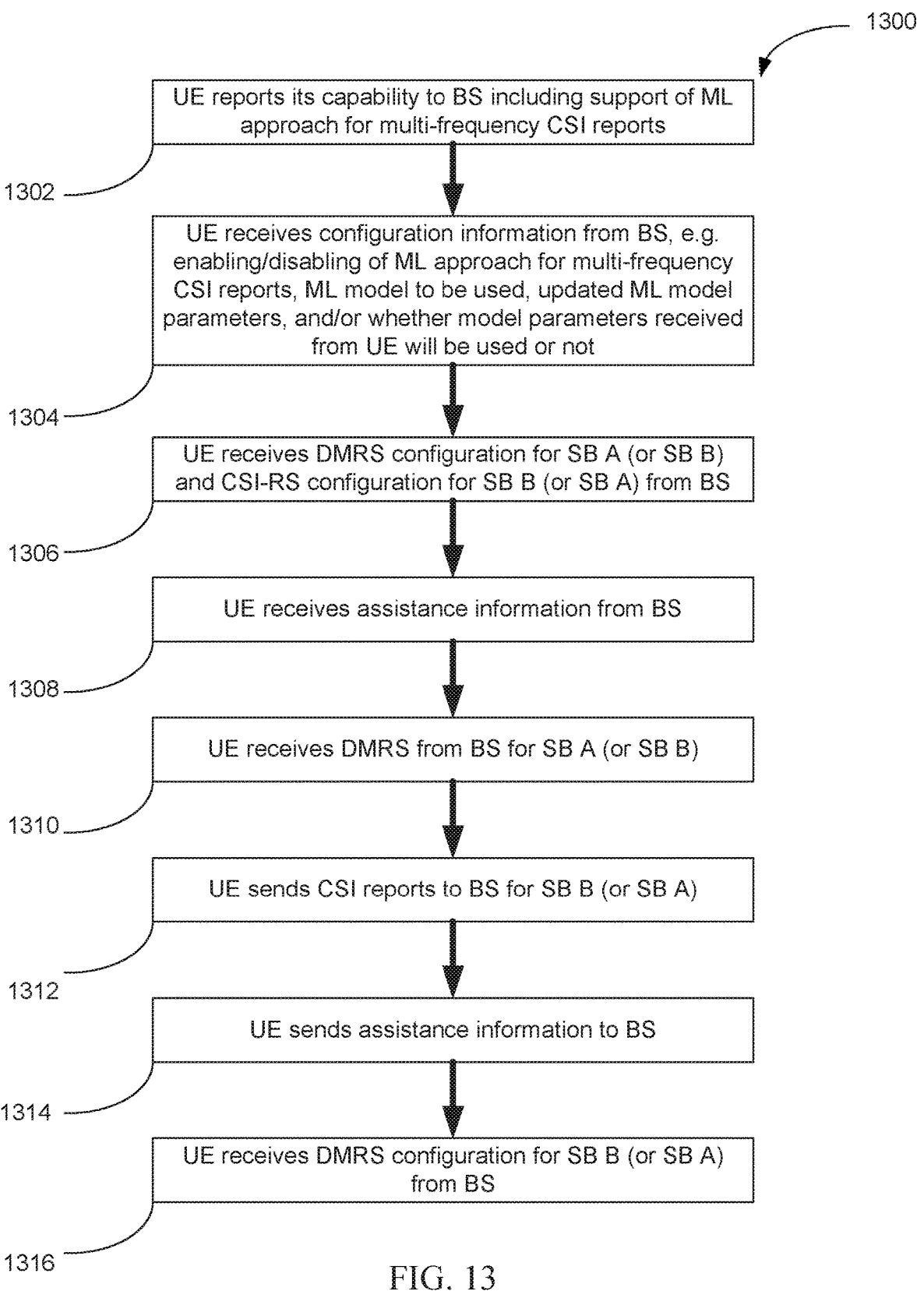
FIG. 13 illustrates a method for operations at a UE to support DMRS-based multi-frequency CSI reports according to embodiments of the present disclosure.

FIG. 13 illustrates an example of a method 1300 for operations at a UE to support DMRS-based multi-frequency CSI reports according to embodiments of the present disclosure. The embodiment of the method 1300 for operations at a UE to support DMRS-based multi-frequency CSI reports in FIG. 13 is for illustration only. FIG. 13 does not limit the scope of this disclosure to any particular implementation of the method 1300 for operations at a UE to support DMRS-based multi-frequency CSI reports.

As illustrated in FIG. 13, the method 1300 begins at step 1302, where a UE (such as the UE 116) reports capability information to a BS, including the support of an ML approach for DMRS-based multi-frequency CSI reports. At step 1304, the UE receives configuration information from the BS, which can include ML-related configuration information such as enabling/disabling of an ML approach for DMRS-based multi-frequency CSI reports, an ML model to be used, trained model parameters, and/or whether model parameter updates reported by a UE will be used or not. At step 1306, the UE receives a DMRS configuration message from the BS for an SB A (or SB B) that includes a CSI-RS configuration message for an SB B (or SB A). At step 1308, the UE receives assistance information from the BS; the assistance information can include beamforming information, which will be described in the "BS assistance information" section. At step 1310, the UE receives a DMRS from the BS for SB A (or SB B). At step 1312, the UE sends CSI reports to the BS for SB B (or SB A). At step 1314, the UE sends assistance information to the BS; the assistance information can include a recommendation for SB switching, which will be described in the "UE assistance information" section. At step 1316, the UE receives a DMRS configuration message from the BS for an SB B (or SB A).

In another embodiment, a new MAC CE can be defined for multi-frequency CSI report configuration. This MAC CE can be identified by a MAC subheader with a logical channel ID that can be specified in Table 6.2.1-2 in [3]. This MAC CE can have a variable size and consist of the following fields:

R: This field is a reserved bit and is set to 0.

Serving Cell ID: This field indicates the identity of the serving cell for this MAC CE.

BWP ID: This field indicates a DL BWP for this MAC CE.

A/D: This field indicates whether a CSI report will be sent for a particular CSI resource. If this field is set to 1, a CSI report will be sent for an associated CSI resource. If this field is set to 0, a CSI report will not be sent for an associated CSI resource.

CSI-ResourceConfigID: This field indicates the ID of the CSI resource that is associated with an A/D field. CSI-RS will not be transmitted on that CSI resource.

Figures 14, 15:
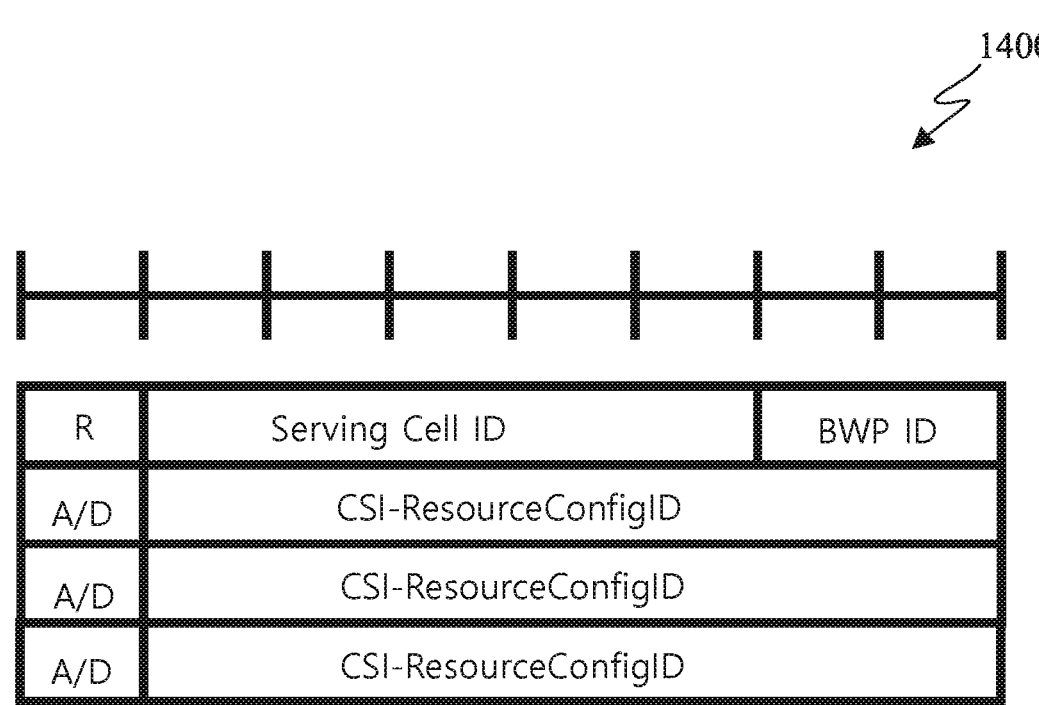
FIG. 14 illustrates an example of a new MAC CE for multi-frequency CSI report configuration according to embodiments of the present disclosure.
FIG. 15 illustrates an example of a new MAC CE for the BS assistance information report according to embodiments of the present disclosure.

FIG. 14 illustrates an example of a new MAC CE for multi-frequency CSI report configuration 1400 according to embodiments of the present disclosure. The embodiment of the MAC CE for multi-frequency CSI report configuration 1400 in FIG. 14 is for illustration only. FIG. 14 does not limit the scope of this disclosure to any particular implementation of the MAC CE for multi-frequency CSI report configuration 1400.

As illustrated in FIG. 14, the MAC CE for multi-frequency CSI report configuration 1400 includes an R field having a length of 1 bit, a Serving Cell ID field having a length of 5 bits, and a BWP ID field having a length of 2 bits. Three CSI resources are included in this example, where each CSI resource ID has a length of 7 bits and its associated A/D field has a length of 1 bit.

In another embodiment, a BS can configure a UE to send multi-frequency CSI reports with frequency hopping via RRC configuration. Table 2 illustrates an example of modifying an IE CSI-ReportConfig to configure a UE to send multi-frequency CSI reports with frequency hopping. For CSI-ReportConfig, additionalMeasurementFrequencyHopping, if present, determines whether the CSI resources that are included in additionalChannelMeasurementResourcesWithoutCSIRS hop within a slot or between slots; additionalMeasurementFrequencyHoppingOffset, if present, determines the hopping pattern of those CSI resources across the available SBs.

TABLE 2

An Example of IE CSI-ReportConfig modification to configure multi-frequency
CSI reports with frequency hopping

```
CSI-ReportConfig ::= SEQUENCE {
    reportConfigId                    CSI-ReportConfigId
    carrier                           ServCellIndex          OPTIONAL, -- Need S
    resourcesForChannelMeasurement                           CSI-ResourceConfigId
    additionalChannelMeasurementResourcesWithoutCSIRS        CSI-ResourceConfigId
OPTIONAL, -- Need R
    additionalMeasurementFrequencyHopping        ENUMERATED {intraSlot, interSlot}
OPTIONAL, -- Need S
    additionalMeasurementFrequencyHoppingOffset        SEQUENCE (SIZE(1..numHops))
OF INTEGER (1..numSubBands) OPTIONAL, -- Need M
    csi-IM-ResourcesForInterference            CSI-ResourceConfigId   OPTIONAL, --
Need R
    ...,
}
```

In another embodiment, a BS can configure a UE with DMRS-based multi-frequency CSI reports via RRC configuration. Table 3 illustrates an example of modifying an IE DMRS-DownlinkConfig to configure DMRS-based multi-frequency CSI reports. For DMRS-DownlinkConfig, additionalChannelMeasurementResourcesWithoutCSIRS, if present, determines whether a UE will send CSI reports for the CSI resources in additionalChannelMeasurementResourcesWithoutCSIRS (while also receiving DMRS on different CSI resources). The CSI resources in additionalChannelMeasurementResourcesWithoutCSIRS can be configured as periodic, semi-persistent, or aperiodic based on measurementReportConfigType (if present).

TABLE 3

An Example of IE DMRS-Downlink Config modification to configure DMRS-
based multi-frequency CSI reports

```
DMRS-DownlinkConfig ::= SEQUENCE {
    dmrs-Type                    ENUMERATED {type2} OPTIONAL, -- Need S
...,
    additionalChannelMeasurementResourcesWithoutCSIRS   CSI-ResourceConfigId
        OPTIONAL, -- Need R
    measurementReportConfigType          CHOICE {
        aperiodic                SEQUENCE {
            slotOffset               INTEGER (1..32) OPTIONAL, -- Need S
        },
        semi-persistent          SEQUENCE {
            slotOffset               INTEGER (1..32) OPTIONAL, -- Need S
            periodicity              INTEGER (1..maxPeriodicity) OPTIONAL, --
Need S
        },
        periodic                 SEQUENCE {
            slotOffset               INTEGER (1..32) OPTIONAL, -- Need S
            periodicity              INTEGER (1..maxPeriodicity) OPTIONAL, --
Need S
        }
    }
}
```

In another embodiment, a BS can configure a UE with DMRS-based multi-frequency CSI reports with frequency hopping via RRC configuration. Table 4 illustrates an example of modifying an IE DMRS-DownlinkConfig to configure DMRS-based multi-frequency CSI reports with frequency hopping. For DMRS-DownlinkConfig, additionalMeasurementFrequencyHopping, if present, determines whether the CSI resources that are included in additionalChannelMeasurementResourcesWithoutCSIRS hop within a slot or between slots (while the UE receives DMRS on different CSI resources); additionalMeasurementFrequencyHoppingOffset, if present, determines the hopping pattern of those CSI resources across the available SBs. In one example, a BS can configure a UE with a DMRS density (on one set of CSI resources) that varies between slots (while it receives CSI reports on another set of CSI resources).

In one embodiment, a new MAC CE can be defined for the UE assistance information report. This MAC CE can be identified by a MAC subheader with a logical channel ID that can be specified in Table 6.2.1-2 in [3]. This MAC CE can have a variable size and consist of the following fields:

Block Error Rate: This field indicates the observed block error rate of the UE, e.g., the block error rate that has been computed over the last 1000 received transport blocks.

Throughput: This field indicates the observed throughput of the UE, e.g., the throughput in megabits/second that has been computed over the last 1000 received transport blocks.

UE Speed: This field indicates the UE's measurement of its speed in meters/second.

TABLE 4

An example of IE DMRS-DownlinkConfig modification to configure DMRS-based
multi-frequency CSI reports with frequency hopping

```
DMRS-DownlinkConfig ::= SEQUENCE {
    dmrs-Type                           ENUMERATED {type2} OPTIONAL, -- Need S
    ...,
    additionalChannelMeasurementResources WithoutCSIRS              CSI-ResourceConfigId
        OPTIONAL, -- Need R
    measurementReportConfigType                     CHOICE {
        aperiodic                       SEQUENCE {
            slotOffset                          INTEGER (1..32) OPTIONAL, -- Need S
        },
        semi-persistent                 SEQUENCE {
            slotOffset                          INTEGER (1..32) OPTIONAL, -- Need S
            periodicity                         INTEGER (1..maxPeriodicity) OPTIONAL, --
Need S
        },
        periodic                        SEQUENCE {
            slotOffset                          INTEGER (1..32) OPTIONAL, -- Need S
            periodicity                         INTEGER (1..maxPeriodicity) OPTIONAL, --
Need S
        }
    }
    additionalMeasurementFrequencyHopping               ENUMERATED {intraSlot, interSlot}
OPTIONAL, -- Need S
    additionalMeasurementFrequencyHoppingOffset             SEQUENCE (SIZE(1..numHops))
OF INTEGER (1..numSubBands) OPTIONAL, -- Need M
}
```

In one embodiment, a new MAC CE can be defined for the BS assistance information report. This MAC CE can be identified by a MAC subheader with a logical channel ID that can be specified in Table 6.2.1-2 in [3]. This MAC CE can have a variable size and consist of the following field:

Beamforming Information: This field indicates information that can be used by the UE to infer the channel for a particular antenna port, including:

PMI that the BS uses for transmissions to the UE,

BS-side mapping from (logical) antenna ports to physical antenna elements,

BS-side spacing between physical antenna elements (e.g., in centimeters), and

Tilt of BS-side array (e.g., azimuth and elevation, measured in degrees).

FIG. 15 illustrates an example of a new MAC CE for the BS assistance information report 1500 according to embodiments of the present disclosure. The embodiment of the MAC CE for the BS assistance information report 1500 in FIG. 15 is for illustration only. FIG. 15 does not limit the scope of this disclosure to any particular implementation of the MAC CE for the BS assistance information report 1500.

As illustrated in FIG. 15, the MAC CE for the BS assistance information report 1500 is shown where the Beamforming Information field has a length of 24 bits.

UE Acceleration: This field indicates the UE's measurement of its acceleration in meters/(second*second).

IR1: This field indicates the presence of the octet(s) containing the Recommended BWP field. If the IR1 field is set to 1, the octet(s) containing the Recommended BWP field is (are) present. If the IR1 field is set to 0, the octet(s) containing the Recommended BWP field is (are) not present.

Recommended BWP: This field indicates the UE's recommended active BWP, e.g., an index to a table of BWPs.

IR2: This field indicates the presence of the octet containing the Recommended SB field. If the IR2 field is set to 1, the octet containing the Recommended SB field is present. If the IR2 field is set to 0, the octet containing the Recommended SB field is not present.

Recommended SB: This field indicates the UE's recommended SB for PDSCH transmission, e.g., an index to a table of SBs.

Figure 16:
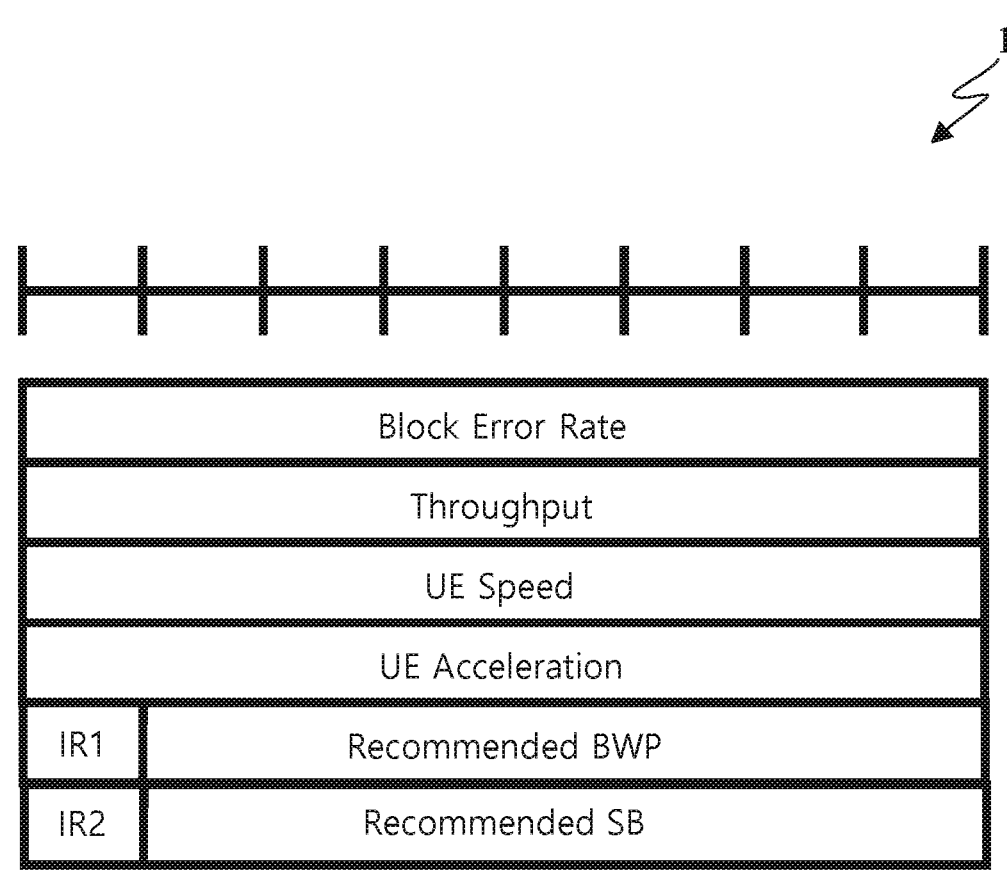
FIG. 16 illustrates an example of a new MAC CE for the UE assistance information report according to embodiments of the present disclosure.

FIG. 16 illustrates an example of a new MAC CE for the UE assistance information report 1600 according to embodiments of the present disclosure. The embodiment of the MAC CE for the UE assistance information report 1600 in FIG. 16 is for illustration only. FIG. 16 does not limit the scope of this disclosure to any particular implementation of the MAC CE for the UE assistance information report 1600.

As illustrated in FIG. 16, the MAC CE for the UE assistance information report 1600 is shown where the Block Error Rate, UE Throughput, UE Speed, and UE Acceleration fields each have a length of 8 bits. The Recommended BWP and the Recommended SB fields each have a length of 7 bits.

Figure 17:
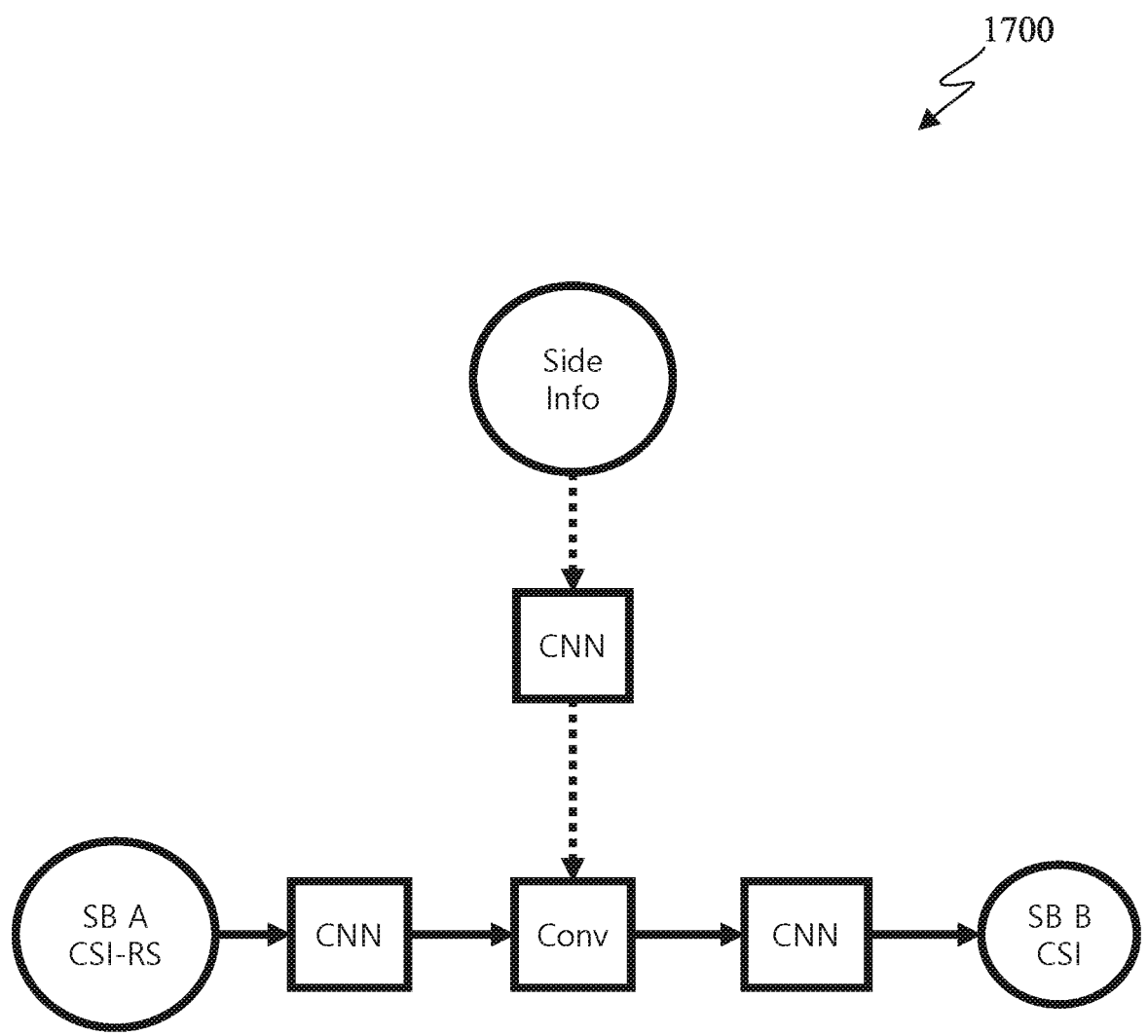
FIG. 17 illustrates an example of an AI/ML model architecture that can support multi-frequency CSI reports according to embodiments of the present disclosure.

FIG. 17 illustrates an example of an AI/ML model architecture 1700 that can support multi-frequency CSI reports according to embodiments of the present disclosure. The embodiment of the AI/ML model architecture 1700 that can support multi-frequency CSI reports in FIG. 17 is for illustration only. FIG. 17 does not limit the scope of this disclosure to any particular implementation of the AI/ML model architecture 1700 that can support multi-frequency CSI reports.

As illustrated in FIG. 17, a CSI-RS pattern in one SB A is provided as input to a CNN. Auxiliary information [5] is provided as input to another CNN. The outputs of these two CNNs are then convolved, and the output of that convolution is provided as input to another CNN, which infers a channel estimate in SB B. For SB A, all REs that do not contain CSI-RS are filled with zeros.

Examples of inputs to an AI/ML model that can support multi-frequency CSI reports include:

Full two-dimensional received channel over the subcarriers and OFDM symbols for one slot and one SB A The REs that do not contain RS are filled with zeros.

Ground truth of full two-dimensional channel over the subcarriers and OFDM symbols for one slot and one SB B This can be a training label.

Auxiliary information:

UE speed,

UE trajectory,

UE location,

Coherence time,

Coherence bandwidth,

Delay spread,

Doppler spread,

Block error rate,

Throughput,

Carrier frequency,

System bandwidth, and

BS-side beamforming information.

Examples of outputs from an AI/ML model that can support multi-frequency CSI reports include:

Full two-dimensional estimated channel over the subcarriers and OFDM symbols for one slot and one SB B.

Recommended DMRS density for PDSCH transmission over one SB B.

In another example, a BS can configure a UE to send multi-frequency CSI reports where the frequency density of CSI-RS can vary between SBs. In this case, steps 806, 906, 1006, and 1106 described above could include configuration information for the frequency density of CSI-RS for each SB in the corresponding message. In one example, this information can correspond to two SBs A and B. In one example, the frequency density of the CSI-RS for SB A can be greater than the frequency density of the CSI-RS for SB B. In another example, the frequency density of the CSI-RS for SB A can be less than the frequency density of the CSI-RS for SB B. In another example, the frequency density of the CSI-RS for SB A can be equal to the frequency density of the CSI-RS for SB B.

In one example, a parameter a is indicated to vary density between SB A and SB B of the CSI-RS (i.e., frequency density of SB A=d→frequency density of SB B=α·d)

Ex) α is fixed (e.g., ½).

Ex) α is configured via RRC, MAC-CE, or DCI, e.g., $$\alpha \in \left\{ \frac{1}{8}, \frac{1}{6}, \frac{1}{4}, \frac{1}{2} \right\}$$

and one of them is indicated (via RRC, MAC-CE or DCI).

Ex) (hierarchical indication) a set of α is configured via RRC, a subset of the set is activated via MAC-CE, and one element of the subset is indicated via DCI.

In another example, a BS can configure a UE to send DMRS-based multi-frequency CSI reports where a BS can also send CSI-RS on the SB that corresponds to the report. In this case, for step 1206 and 1306 described above, a BS can also send CSI-RS on SB B (or SB A).

Table 5 illustrates an example of modifying an IE DMRS-DownlinkConfig to configure DMRS-based multi-frequency CSI reports where a BS can also send CSI-RS on the SB that corresponds to the report. For DMRS-DownlinkConfig, additionalChannelMeasurementResources, if present, determines whether a UE will send CSI reports for the CSI resources in additionalChannelMeasurementResources (while also receiving DMRS on different CSI resources). The CSI resources in additionalChannelMeasurementResources can be configured as periodic, semi-persistent, or aperiodic based on measurementReportConfigType (if present).

TABLE 5

An example of IE DMRS-DownlinkConfig modification to configure
DMRS-based multi-frequency CSI reports where a BS can also send CSI-RS on the
SB that corresponds to the report.

```
DMRS-DownlinkConfig ::= SEQUENCE {
    dmrs-Type                           ENUMERATED {type2} OPTIONAL, -- Need
S
    ... ,
    additionalChannelMeasurementResourcesWithoutCSIRS      CSI-ResourceConfigId
            OPTIONAL, -- Need R
    measurementReportConfigType                     CHOICE {
        aperiodic                       SEQUENCE {
    slotOffset                          INTEGER (1 .. 32) OPTIONAL, -- Need S
        },
```

TABLE 5-continued

An example of IE DMRS-DownlinkConfig modification to configure
DMRS-based multi-frequency CSI reports where a BS can also send CSI-RS on the
SB that corresponds to the report.

```
semi-persistent                    SEQUENCE {
    slotOffset                         INTEGER (1 .. 32) OPTIONAL, -- Need S
    periodicity                        INTEGER (1 .. maxPeriodicity) OPTIONAL, -
- Need S
    },
    periodic                       SEQUENCE {
    slotOffset                         INTEGER (1 .. 32) OPTIONAL, -- Need S
    periodicity                        INTEGER (1 .. maxPeriodicity) OPTIONAL, -
- Need S
    }
  }
}
```

Table 6 illustrates an example of modifying an IE DMRS-DownlinkConfig to configure DMRS-based multi-frequency CSI reports with frequency hopping—where a BS can also send CSI-RS on each SB that corresponds to the report. For DMRS-DownlinkConfig, additionalMeasurementFrequencyHopping, if present, determines whether the CSI resources that are included in additionalChannelMeasurementResources hop within a slot or between slots (while the UE receives DMRS on different CSI resources); additionalMeasurementFrequencyHoppingOffset, if present, determines the hopping pattern of those CSI resources across the available SBs. In one example, a BS can configure a UE with a DMRS density (on one set of CSI resources) that varies between slots (while it receives CSI reports on another set of CSI resources).

In the present disclosure, the term "differential CSI prediction" is used to refer to a CSI prediction method that computes the differences between CSI observations and uses those differences to predict future CSI observations. The term "full CSI prediction" is used to refer to a CSI prediction method that uses CSI observations to predict future CSI observations.

FIG. 18 illustrates an example of a method 1800 for operations at a BS to support techniques for differential CSI prediction according to embodiments of the disclosure. The embodiment of the method 1800 for operations at a BS to support techniques for differential CSI prediction in FIG. 18 is for illustration only. FIG. 18 does not limit the scope of

TABLE 6

An example of IE DMRS-DownlinkConfig modification to configure DMRS-based
multi-frequency CSI reports with frequency hopping - where a BS can also send CSI-RS
on each SB that corresponds to the report

```
DMRS-DownlinkConfig ::= SEQUENCE {
    dmrs-Type                          ENUMERATED {type2} OPTIONAL, -- Need S
...,
    additionalChannelMeasurementResources           CSI-ResourceConfigld   OPTIONAL, -- Need
R
    measurementReportConfigType                     CHOICE {
        aperiodic                      SEQUENCE {
        slotOffset                             INTEGER (1 .. 32) OPTIONAL, -- Need S
        },
        semi-persistent                             SEQUENCE {
        slotOffset                             INTEGER (1 .. 32) OPTIONAL, -- Need S
        periodicity                            INTEGER (1 .. maxPeriodicity) OPTIONAL, -- Need S
        },
        periodic                       SEQUENCE {
        slotOffset                             INTEGER (1 .. 32) OPTIONAL, -- Need S
        periodicity                            INTEGER (1 .. maxPeriodicity) OPTIONAL, -- Need S
        }
    }
    additionalMeasurementFrequencyHopping           ENUMERATED {intraSlot, interSlot }
OPTIONAL, -- Need S
    additionalMeasurementFrequencyHoppingOffset             SEQUENCE (SIZE(1 .. numHops)) OF
INTEGER (1 .. numSubBands) OPTIONAL, -- Need M
}
```

An AI/ML model architecture that can support multi-frequency CSI reports can also use the full two-dimensional received channel over the subcarriers and OFDM symbols for one slot and one SB B as auxiliary information, where all REs that do not contain RS are filled with zeros. The received channel for SB B can be combined with the received channel for SB A to obtain the full two-dimensional estimated channel over the subcarriers and OFDM symbols for SB B for one slot.

this disclosure to any particular implementation of the method 1800 for operations at a BS to support techniques for differential CSI prediction.

As illustrated in FIG. 18, the method 1800 begins at step 1802, where a BS (such as the BS 102) receives UE capability information from a UE, including the support of an ML approach for differential CSI prediction. At step 1804, the BS sends configuration information to a UE, which can include ML-related configuration information such as enabling/disabling of an ML approach for differential CSI prediction, an ML model to be used, trained model parameters, and/or whether model parameter updates reported by the UE will be used or not. At step 1806, the BS sends CSI-RS to the UE. At step 1808, the BS receives CSI predictions from the UE. In one example, these CSI predictions can be generated by a full CSI prediction method. At step 1810, the BS receives assistance information from a UE; the assistance information can include a recommendation for a differential CSI prediction method, which will be described in the "UE assistance information" section. At step 1812, the BS sends a message to a UE that configures it to apply a differential CSI prediction method.

Figure 19:
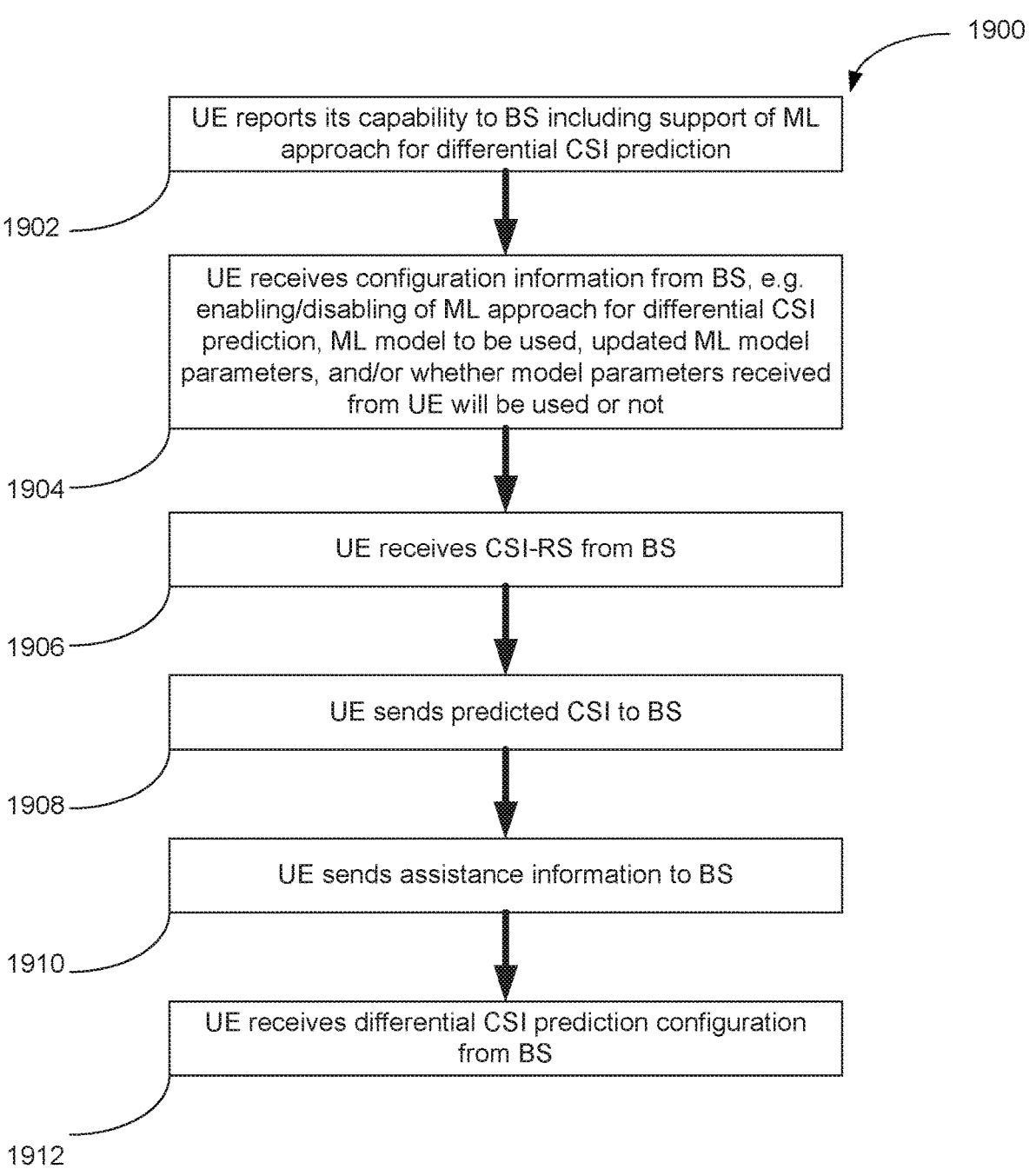
FIG. 19 illustrates a method for operations at a UE to support techniques for differential CSI prediction according to embodiments of the disclosure.

FIG. 19 illustrates a method 1900 for operations at a UE to support techniques for differential CSI prediction according to embodiments of the disclosure. The embodiment of the method 1900 for operations at a UE to support techniques for differential CSI prediction in FIG. 19 is for illustration only. FIG. 19 does not limit the scope of this disclosure to any particular implementation of the method 1900 for operations at a BS to support techniques for differential CSI prediction.

As illustrated in FIG. 19, the method begins at step 1902, where a UE (such as the UE 116) reports capability information to a BS, including the support of an ML approach for differential CSI prediction. At step 1904, the UE receives configuration information from the BS, which can include ML-related configuration information such as enabling/disabling of an ML approach for differential CSI prediction, an ML model to be used, trained model parameters, and/or whether model parameter updates reported by a UE will be used or not. At step 1906, the UE receives CSI-RS from a BS. At step 1908, the UE sends CSI predictions to the BS. In one example, these CSI predictions can be generated by a full CSI prediction method. At step 1910, the UE sends assistance information to the BS; the assistance information can include a recommendation for a differential CSI prediction method, which will be described in the "UE assistance information" section. At step 1912, the UE receives a message from the BS that configures it to apply a differential CSI prediction method.

FIG. 20 illustrates an example of a method 2000 for operations at a BS to support UE-initiated disabling of differential CSI prediction according to embodiments of the disclosure. The embodiment of the method 2000 for operations at a BS to support UE-initiated disabling of differential CSI prediction in FIG. 20 is for illustration only. FIG. 20 does not limit the scope of this disclosure to any particular implementation of the method 2000 for operations at a BS to support UE-initiated disabling of differential CSI prediction.

As illustrated in FIG. 20, the method begins at step 2002, where a BS (such as the BS 102) receives UE capability information from a UE, including the support of an ML approach for differential CSI prediction. At step 2004, the BS sends configuration information to the UE, which can include ML-related configuration information such as enabling/disabling of an ML approach for differential CSI prediction, an ML model to be used, trained model parameters, and/or whether model parameter updates reported by the UE will be used or not. At step 2006, the BS sends CSI-RS to the UE. At step 2008, the BS receives CSI predictions from the UE. In one example, these CSI predictions can be generated by a full CSI prediction method. At step 2010, the BS receives assistance information from the UE; the assistance information can include a recommendation for a differential CSI prediction method, which will be described in the "UE assistance information" section. At step 2012, the BS sends a message to the UE that configures it to apply a differential CSI prediction method. At step 2014, the BS receives a request from the UE to disable differential CSI prediction. In one example, the UE can generate this request based on a computation of a similarity metric between predicted CSI and ground-truth CSI. At step 2016, the BS sends a CSI prediction configuration message to the UE. In one example, this message can configure a UE to apply a full CSI prediction method.

Figure 21:
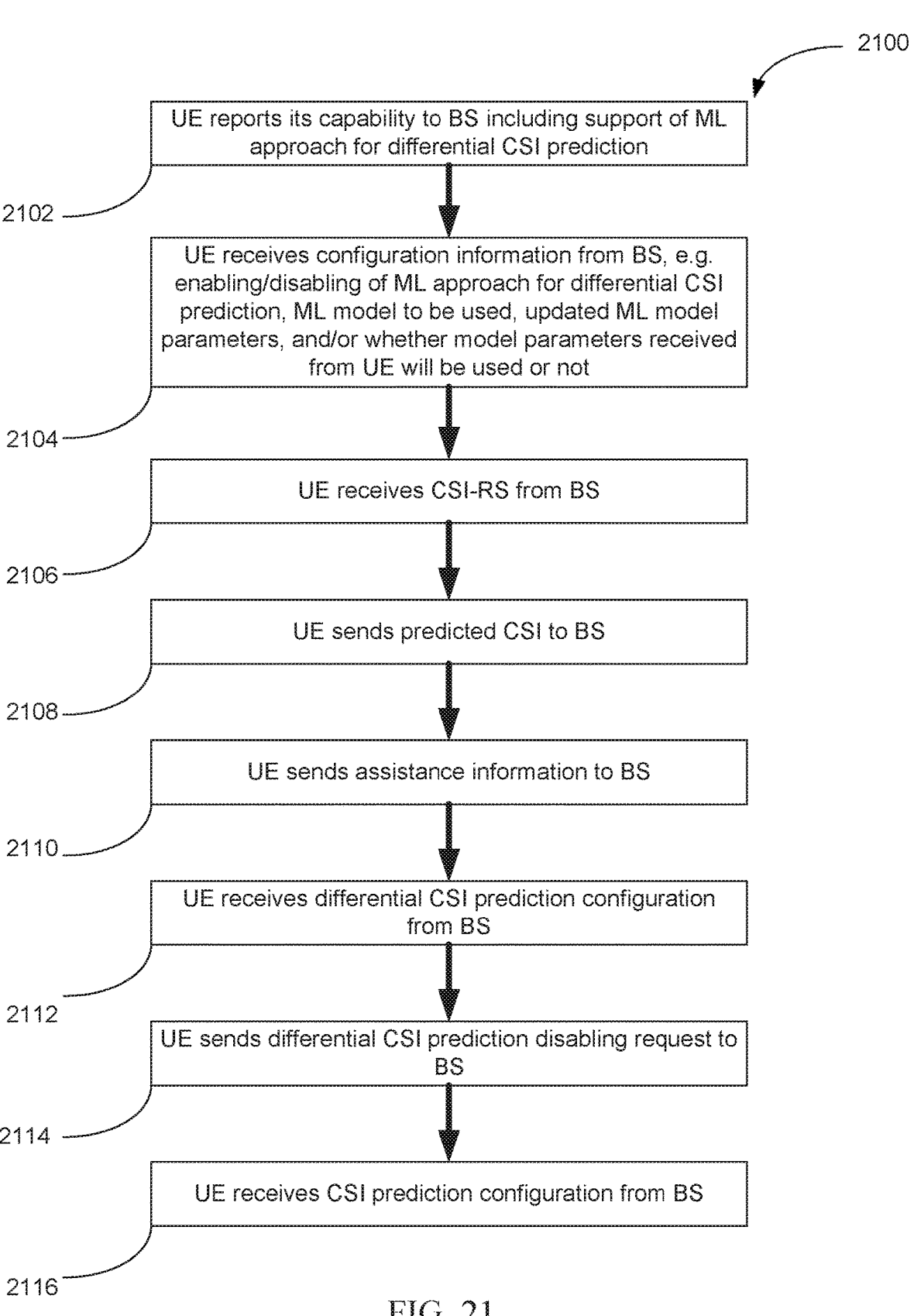
FIG. 21 illustrates a method for operations at a UE to support UE-initiated disabling of differential CSI prediction according to embodiments of the disclosure.

FIG. 21 illustrates an example of a method 2100 for operations at a UE to support UE-initiated disabling of differential CSI prediction according to embodiments of the disclosure. The embodiment of the method 2100 for operations at a UE to support UE-initiated disabling of differential CSI prediction in FIG. 21 is for illustration only. FIG. 21 does not limit the scope of this disclosure to any particular implementation of the method 2100 for operations at a UE to support UE-initiated disabling of differential CSI prediction.

As illustrated in FIG. 21, the method 2100 begins at step 2102, where a UE (such as the UE 116) reports capability information to a BS, including the support of an ML approach for differential CSI prediction. At step 2104, the UE receives configuration information from the BS, which can include ML-related configuration information such as enabling/disabling of an ML approach for differential CSI prediction, an ML model to be used, trained model parameters, and/or whether model parameter updates reported by a UE will be used or not. At step 2106, the UE receives CSI-RS from the BS. At step 2108, the UE sends CSI predictions to the BS. In one example, these CSI predictions can be generated by a full CSI prediction method. At step 2110, the UE sends assistance information to the BS; the assistance information can include a recommendation for a differential CSI prediction method, which will be described in the "UE assistance information" section. At step 2112, the UE receives a message from the BS that configures it to apply a differential CSI prediction method. At step 2114, the UE sends a request to the BS to disable differential CSI prediction. In one example, the UE can generate this request based on a computation of a similarity metric between predicted CSI and ground-truth CSI. At step 2116, the UE receives a CSI prediction configuration message from the BS. In one example, this message can configure a UE to apply a full CSI prediction method.

FIG. 22 illustrates an example of a method 2200 for operations at a BS to support BS-initiated disabling of differential CSI prediction according to embodiments of the disclosure. The embodiment of the method 2200 for operations at a BS to support BS-initiated disabling of differential CSI prediction in FIG. 22 is for illustration only. FIG. 22 does not limit the scope of this disclosure to any particular implementation of the method 2200 for operations at a BS to support BS-initiated disabling of differential CSI prediction.

At step 2202, the BS receives UE capability information from a UE, including the support of an ML approach for differential CSI prediction. At step 2204, the BS sends configuration information to the UE, which can include ML-related configuration information such as enabling/disabling of an ML approach for differential CSI prediction, an ML model to be used, trained model parameters, and/or whether model parameter updates reported by a UE will be used or not. At step 2206, the BS sends CSI-RS to the UE. At step 2208, the BS receives CSI predictions from the UE. In one example, these CSI predictions can be generated by a full CSI prediction method. At step 2210, the BS receives assistance information from the UE; the assistance information can include a recommendation for a differential CSI prediction method, which will be described in the "UE assistance information" section. At step 2212, the BS sends a message to the UE that configures it to apply a differential CSI prediction method. At step 2214, the BS receives CSI predictions from the UE that have been generated by a differential CSI prediction method. At step 2216, the BS sends a CSI prediction configuration message to the UE. In one example, this message can configure the UE to apply a full CSI prediction method, where the BS can generate this message based on its received ACK/NACK messages from the UE. In another example, this message can configure the UE to continue applying a differential CSI prediction method—but with modified parameters.

Figure 23:
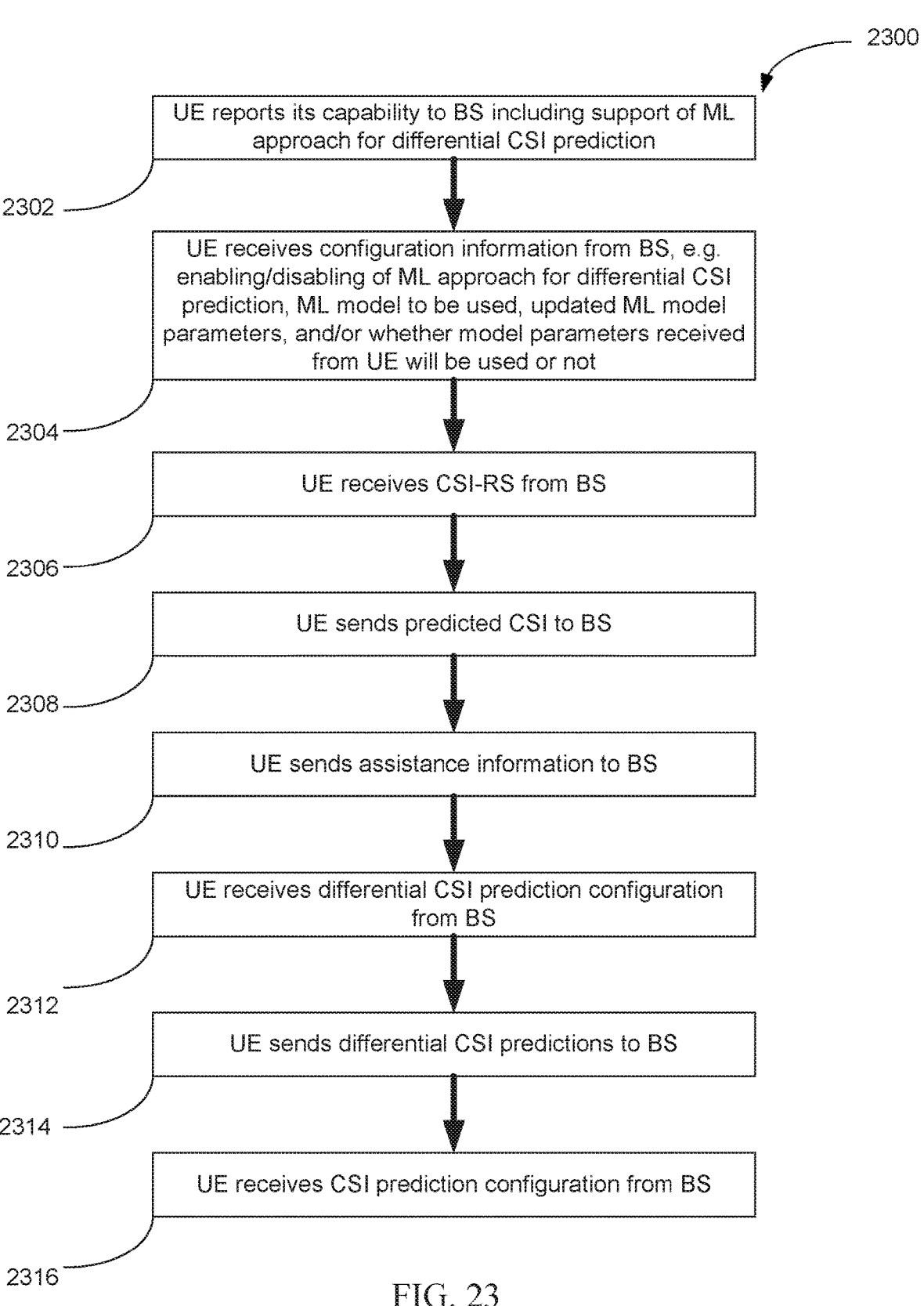
FIG. 23 illustrates a method for operations at a UE to support BS-initiated disabling of differential CSI prediction according to embodiments of the disclosure.

FIG. 23 illustrates an example of a method 2300 for operations at a UE to support BS-initiated disabling of differential CSI prediction according to embodiments of the disclosure. The embodiment of the method 2300 for operations at a UE to support BS-initiated disabling of differential CSI prediction in FIG. 23 is for illustration only. FIG. 23 does not limit the scope of this disclosure to any particular implementation of the method 2300 for operations at a UE to support BS-initiated disabling of differential CSI prediction.

As illustrated in FIG. 23, the method begins at step 2302, where a UE (such as the UE 116) reports capability information to a BS, including the support of an ML approach for differential CSI prediction. At step 2304, the UE receives configuration information from the BS, which can include ML-related configuration information such as enabling/disabling of an ML approach for differential CSI prediction, an ML model to be used, trained model parameters, and/or whether model parameter updates reported by a UE will be used or not. At step 2306, the UE receives CSI-RS from the BS. At step 2308, the UE sends CSI predictions to the BS. In one example, these CSI predictions can be generated by a full CSI prediction method. At step 2310, the UE sends assistance information to the BS; the assistance information can include a recommendation for a differential CSI prediction method, which will be described in the "UE assistance information" section. At step 2312, the UE receives a message from the BS that configures it to apply a differential CSI prediction method. At step 2314, the UE sends CSI predictions to a BS that have been generated by a differential CSI prediction method. At step 2316, the UE receives a CSI prediction configuration message from the BS. In one example, this message can configure the UE to apply a full CSI prediction method, where the BS can generate this message based on its received ACK/NACK messages from the UE. In another example, this message can configure the UE to continue applying a differential CSI prediction method—but with modified parameters.

FIG. 24 illustrates an example of a method 2400 for operations at a BS to support transmission configuration switching according to embodiments of the disclosure. The embodiment of the method 2400 for operations at a BS to support transmission configuration switching in FIG. 24 is for illustration only. FIG. 24 does not limit the scope of this disclosure to any particular implementation of the method 2400 for operations at a BS to support transmission configuration switching.

As illustrated in FIG. 24, the method 2400 begins at step 2402, where a BS (such as the BS 102) receives UE capability information from a UE, including the support of an ML approach for CSI prediction. At step 2404, the BS sends configuration information to the UE, which can include ML-related configuration information such as enabling/disabling of an ML approach for CSI prediction, an ML model to be used, trained model parameters, and/or whether model parameter updates reported by a UE will be used or not. At step 2406, the BS sends CSI-RS to the UE. At step 2408, the BS receives CSI predictions from the UE. In one example, these CSI predictions can be generated by a full CSI prediction method. In another example, these CSI predictions can be generated by a differential CSI prediction method. At step 2410, the BS receives assistance information from the UE; the assistance information can include a recommendation for a transmission configuration, which will be described in the "UE assistance information" section. In one example, this transmission configuration recommendation can include MCS information; in another example, this transmission configuration recommendation can include rank information. At step 2412, the BS sends a transmission configuration switching command to the UE.

FIG. 25 illustrates an example of a method 2500 for operations at a UE to support AI/ML techniques for transmission configuration switching according to embodiments of the disclosure. The embodiment of the method 2500 for operations at a UE to support AI/ML techniques for transmission configuration switching in FIG. 25 is for illustration only. FIG. 25 does not limit the scope of this disclosure to any particular implementation of the method 2500 for operations at a UE to support AI/ML techniques for transmission configuration switching.

As illustrated in FIG. 25, the method begins at step 2502, where a UE (such as the UE 116) reports capability information to a BS, including the support of an ML approach for CSI prediction. At step 2504, the UE receives configuration information from the BS, which can include ML-related configuration information such as enabling/disabling of an ML approach for CSI prediction, an ML model to be used, trained model parameters, and/or whether model parameter updates reported by a UE will be used or not. At step 2506, the UE receives CSI-RS from the BS. At step 2508 the UE sends CSI predictions to the BS. In one example, these CSI predictions can be generated by a full CSI prediction method. In another example, these CSI predictions can be generated by a differential CSI prediction method. At step 2510, the UE sends assistance information to the BS; the assistance information can include a recommendation for a transmission configuration, which will be described in the "UE assistance information" section. In one example, this transmission configuration recommendation can include MCS information; in another example, this transmission configuration recommendation can include rank information. At step 2512, the UE receives a transmission configuration switching command from the BS.

In one embodiment, a BS can configure a UE to apply differential CSI prediction. Table 7 is an example of modifying an IE CSI-ReportConfig to configure a UE to apply differential CSI prediction. In this example, if diffCsiPrediction is set to True, then a UE applies differential CSI prediction. In another example, a new DCI format can be defined to support differential CSI prediction. This DCI format can include a Boolean flag that, when set to True, configures a UE to apply differential CSI prediction.

TABLE 7

An example of IE CSI-ReportConfig modification to configure differential CSI
prediction

```
CSI-ReportConfig ::= SEQUENCE {
    reportConfigId                      CSI-ReportConfigId
    carrier                     ServCellIndex       OPTIONAL, -- Need S
    resourcesForChannelMeasurement          CSI-ResourceConfigId
    csi-IM-ResourcesForInterference         CSI-ResourceConfigId   OPTIONAL, --
Need R
    diffCsiPrediction           BOOLEAN
    ...,
}
```

In another embodiment, a BS can configure a UE to use certain parameters when applying differential CSI prediction. Table 8 is an example of modifying an IE CSI-ReportConfig to configure a UE to use certain parameters when applying differential CSI prediction. In this example, diffCsiPredictionInterval configures the time interval between CSI observations (e.g., in units of slots, milliseconds, etc.) for differential CSI prediction. diffCsiPrediction-Window determines the duration of the window of CSI observations (e.g., in units of slots, milliseconds, etc.) for differential CSI prediction. In another example, a new DCI format can be defined to configure a UE to use certain parameters for differential CSI prediction. This DCI format can include parameters for differential CSI prediction, e.g., the time interval between CSI observations, the duration of the window of CSI observations, etc.

TABLE 8

An example of IE CSI-ReportConfig modification to configure parameters for
differential CSI prediction

```
CSI-ReportConfig ::= SEQUENCE {
reportConfigId                      CSI-ReportConfigId
    carrier                     ServCellIndex       OPTIONAL, -- Need S
    resourcesForChannelMeasurement          CSI-ResourceConfigId
    csi-IM-ResourcesForInterference         CSI-ResourceConfigId OPTIONAL, --
Need R
    diffCsiPredictionInterval           INTEGER (0 .. maxNumSlots)
    diffCsiPrediction Window            INTEGER (0 .. maxNumSlots)
    ...,
}
```

In another embodiment, a BS can configure a UE to report differential CSI predictions. Table 9 is an example of modifying an IE CSI-ReportConfig to configure a UE to report differential CSI prediction. In this example, diffCsiPredictionReport determines the contents of the CSI report for differential CSI prediction. In one example, a UE can be configured to only report its prediction of the difference between the current CSI observation and the next CSI observation. In another example, a UE can be configured to only report the current CSI observation. In another example, a UE can be configured to report 1) its prediction of the difference between the current CSI observation and the next CSI observation and 2) the current CSI observation. In another example, a UE can be configured to report 1) its prediction of the difference between the current CSI observation and the next CSI observation and 2) its prediction of the next CSI observation.

An example of IE CSI-ReportConfig modification to configure reporting of
differential CSI predictions

```
CSI-ReportConfig ::= SEQUENCE {
    reportConfigId                      CSI-ReportConfigId
    carrier                     ServCellIndex       OPTIONAL, -- Need S
    resourcesForChannelMeasurement          CSI-ResourceConfigId
    csi-IM-ResourcesForInterference         CSI-ResourceConfigId OPTIONAL, --
Need R
    diffCsiPredictionReport             ENUMERATED {opt1, opt2, opt3, opt4}
    ...,
}
```

In another example, a UE can be configured to include its predictions for multiple future CSI observations within a single CSI report. At a time $T_0$, a UE can report its predictions for the CSI observations at future times $T_1$, $T_2$, $T_3$, etc.

In one embodiment, a rule is pre-determined to prevent error propagation that can happen in a process of the CSI report for differential CSI prediction, e.g., when a UE is configured to report its prediction of the difference between the current CSI observation and the next CSI prediction. The rule follows at least one of the following examples.

In one example, a parameter to enable the UE to count the occasion (a) of the CSI report for differential CSI prediction can be configured to the UE. Once it is enabled, the UE counts the occasion of the CSI report for differential CSI prediction and reports it to the NW as a part of the CSI report. If the reported value of a is different from the value at the NW, the NW may reset the process for differential CSI prediction to the legacy CSI process (i.e., fallback mode to perform the legacy CSI report).

In one example, $\alpha$ is counted under a modulo operation, e.g., $\alpha$ mod $\alpha_{max}$, where $\alpha_{max}$ is fixed or configured. For example, $\alpha_{max} \in \{8,16,32,64\}$ and one of the values can be configured/updated via DCI, MAC-CE, or higher-layer parameter RRC.

In one example, when a NW does not successfully decode the UCI part that contains a CSI report for differential CSI prediction, the NW can indicate to the UE that the current CSI report has not been received (e.g., NACK information). The indication can be made via DCI, i.e., aperiodically (or MAC-CE, RRC). The UE sends ACK information to the NW if it receives the NACK information from the NW and sets the current CSI to the previous CSI (i.e., the latest CSI that has been successfully decoded by the NW).

In one example, when a NW does not successfully decode the UCI part that contains a CSI report for differential CSI prediction, the NW can request retransmission of the CSI report by the UE. The request can be made via DCI, i.e., aperiodically (or MAC-CE, RRC). The UE retransmits the CSI report to the NW if it receives the retransmission request from the NW.

In one example, a NW can configure a UE to report its differential CSI prediction error, which can be computed once a UE makes its next CSI observation. Reporting of differential CSI prediction error can be configured via DCI, MAC-CE, or RRC. If the reported differential CSI prediction error exceeds a pre-defined threshold, in one example, a NW can configure a UE to convey legacy CSI reports. In another example, a NW can configure a UE to apply another CSI prediction method (e.g., a conventional CSI predictor, an AI-based full CSI predictor that predicts the next CSI observation, another AI-based differential CSI predictor, etc.).

In one example, a NW can configure a UE to report a measure of uncertainty in its differential CSI prediction. Reporting of this uncertainty metric can be configured via DCI, MAC-CE, or RRC. If the reported measure of uncertainty exceeds a pre-defined threshold, in one example, a NW can configure a UE to convey legacy CSI reports. In another example, a NW can configure a UE to apply another CSI prediction method (e.g., a conventional CSI predictor, an AI-based full CSI predictor that predicts the next CSI observation, another AI-based differential CSI predictor, etc.).

In one embodiment, any combination of the above rules can be configured.

In one embodiment, a new MAC CE can be defined for the UE assistance information report. This MAC CE can be identified by a MAC subheader with a logical channel ID that can be specified in Table 6.2.1-2 in [3]. This MAC CE can have a variable size and consist of the following fields:

Block Error Rate: This field indicates the observed block error rate of the UE, e.g., the block error rate that has been computed over the last 1000 received transport blocks.

Throughput: This field indicates the observed throughput of the UE, e.g., the throughput in megabits/second that has been computed over the last 1000 received transport blocks.

UE Speed: This field indicates the UE's measurement of its speed in meters/second.

UE Acceleration: This field indicates the UE's measurement of its acceleration in meters/(second*second).

IR1: This field indicates the presence of the octet(s) containing the Recommended Prediction Method field. If the IR1 field is set to 1, the octet(s) containing the Recommended Prediction Method field is (are) present. If the IR1 field is set to 0, the octet(s) containing the Recommended Prediction Method field is (are) not present.

Recommended Prediction Method: This field indicates the UE's recommended CSI prediction method. In one example, this could correspond to a differential CSI prediction method. In another example, this could correspond to a full CSI prediction method. In another example, this could correspond to a conventional (i.e., non-AI-based) prediction method.

IR2: This field indicates the presence of the octet containing the Recommended Transmission Configuration field. If the IR2 field is set to 1, the octet containing the Recommended Transmission Configuration field is present. If the IR2 field is set to 0, the octet containing the Recommended Transmission Configuration field is not present.

Recommended Transmission Configuration: This field indicates the UE's recommended transmission configuration. In one example, this could correspond to an MCS value. In another example, this could correspond to a rank value.

Figure 26:
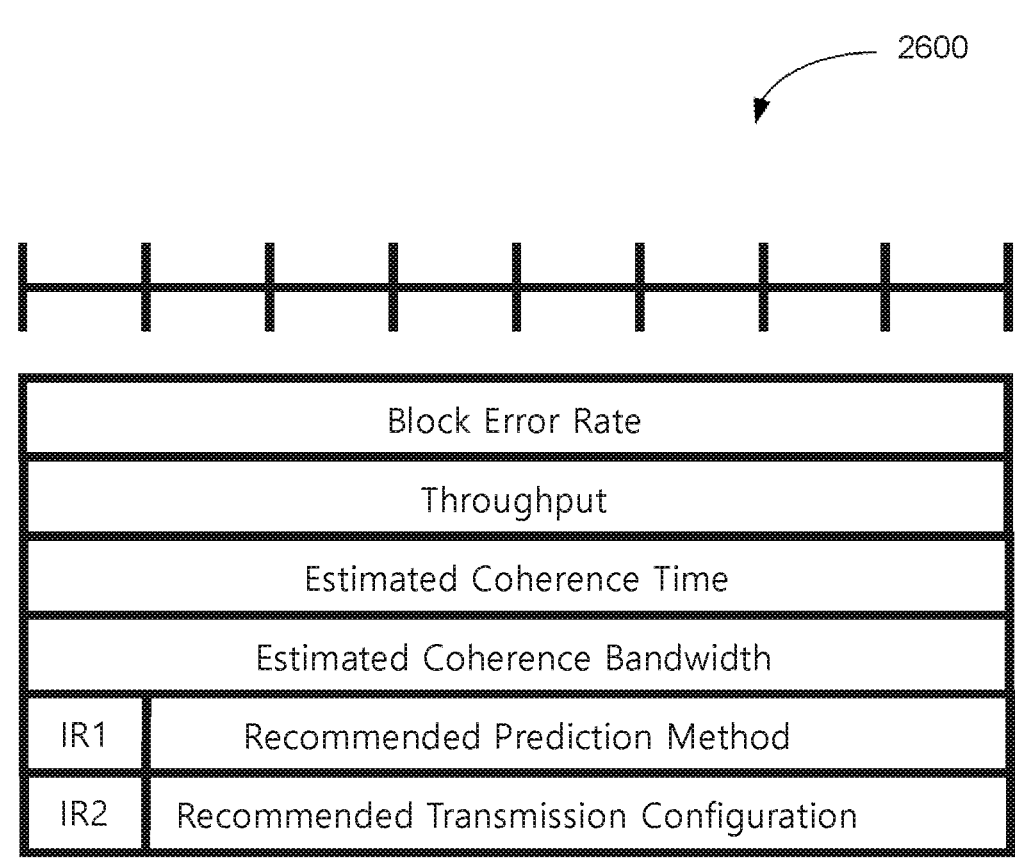
FIG. 26 illustrates an example of a new MAC CE for the UE assistance information report according to embodiments of the present disclosure.

FIG. 26 illustrates an example of a new MAC CE for the UE assistance information report 2600 according to embodiments of the present disclosure. The embodiment of the MAC CE for the UE assistance information report 2600 in FIG. 26 is for illustration only. FIG. 26 does not limit the scope of this disclosure to any particular implementation of the MAC CE for the UE assistance information report 2600.

As illustrated in FIG. 26, the MAC CE for the UE assistance information report 2600 is shown where the Block Error Rate, UE Throughput, UE Speed, and UE Acceleration fields each have a length of 8 bits. The Recommended Prediction Method and the Recommended Transmission Configuration fields each have a length of 7 bits.

In one embodiment, a new MAC CE can be defined for the differential CSI prediction disabling request. This MAC CE can be identified by a MAC subheader with a logical channel ID that can be specified in Table 6.2.1-2 in [3]. This MAC CE can have a variable size and consist of the following fields:

Differential CSI Prediction Disable: This field can include one or more of the following information:

Recommended CSI prediction method, e.g., a full CSI prediction method, a conventional (i.e., non-AI-based) method.

Recommended parameters for a differential CSI prediction method.

Figure 27:
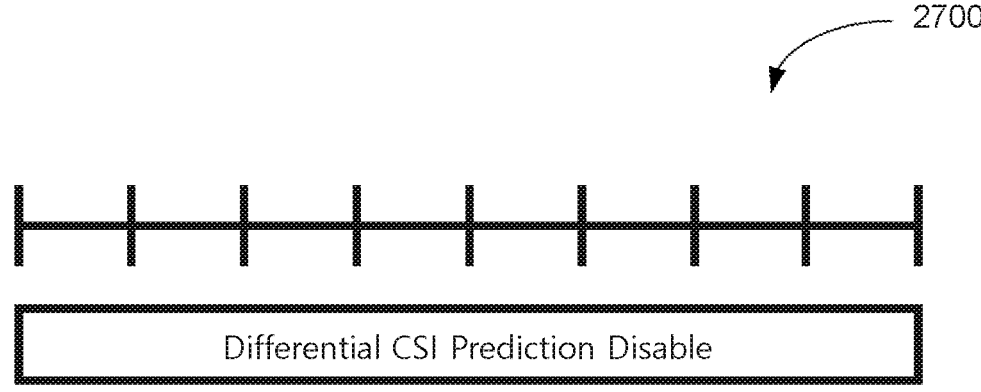
FIG. 27 illustrates an example of a new MAC CE for the differential CSI prediction disabling request according to embodiments of the present disclosure.

FIG. 27 illustrates an example of a new MAC CE for the differential CSI prediction disabling request 2700 according to embodiments of the present disclosure. The embodiment of the MAC CE for the differential CSI prediction disabling request 2700 in FIG. 27 is for illustration only. FIG. 27 does not limit the scope of this disclosure to any particular implementation of the MAC CE for the differential CSI prediction disabling request 2700.

As illustrated in FIG. 27, the Differential CSI Prediction disable field has a length of 8 bits.

Figure 28:
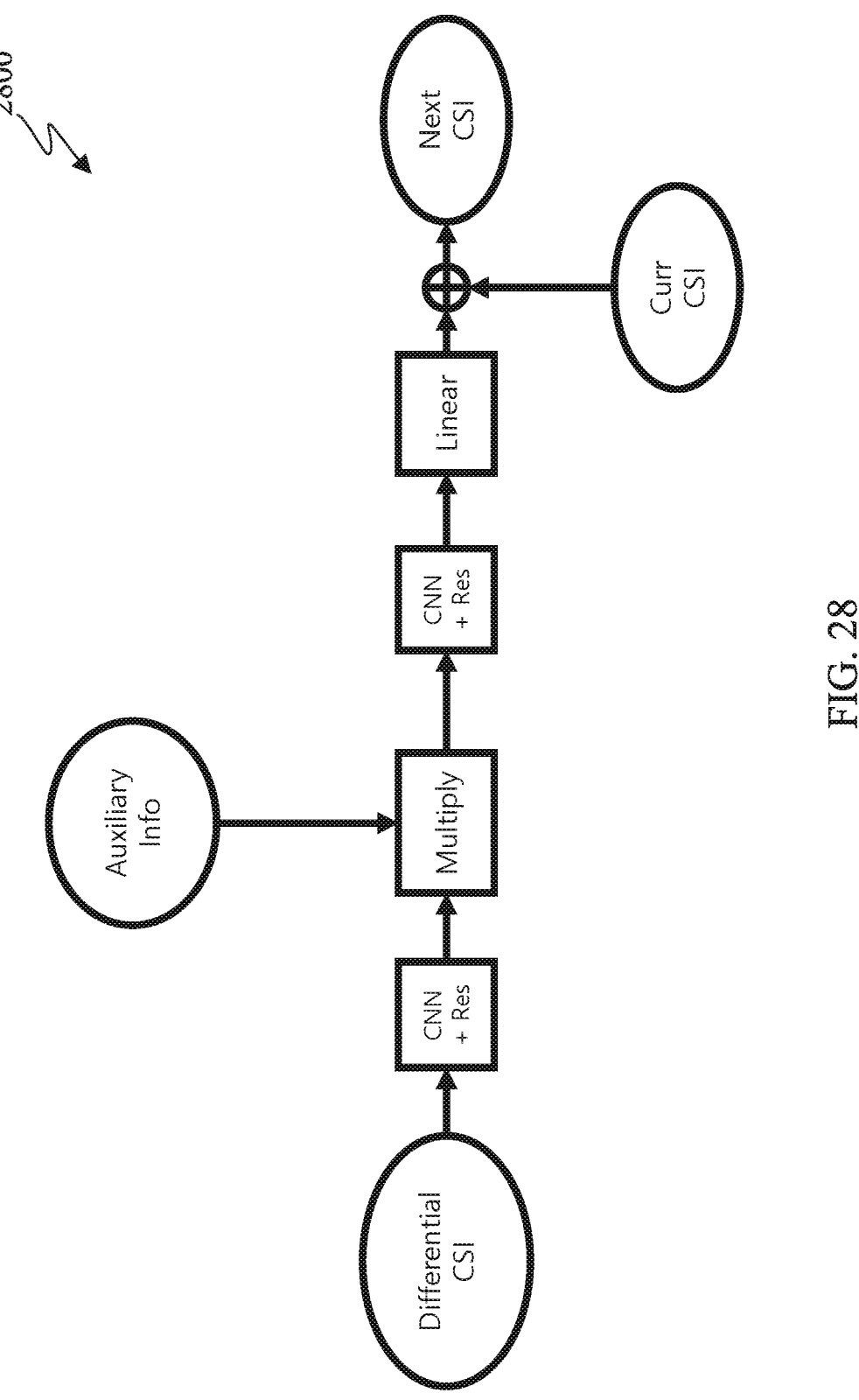
FIG. 28 illustrates an example of an AI/ML model architecture that can support differential CSI prediction according to embodiments of the present disclosure.

FIG. 28 illustrates an example of an AI/ML model architecture that can support differential CSI prediction 2800 according to embodiments of the present disclosure. The embodiment of the AI/ML model architecture that can support differential CSI prediction 2800 in FIG. 28 is for illustration only. FIG. 28 does not limit the scope of this disclosure to any particular implementation of the AI/ML model architecture that can support differential CSI prediction 2800.

As illustrated in FIG. 28, one or multiple differences between CSI observations is provided as input to a combination of a CNN and a ResNet. The output of this combination of a CNN and a ResNet is multiplied by auxiliary information [5]. The output is provided as input to another combination of a CNN and a ResNet. The output of this combination is passed through a linear layer. The output is then combined with the current CSI observation. The result is a prediction of the next CSI observation.

Examples of inputs to an AI/ML model that can support differential CSI prediction include:

One or multiple differences between full two-dimensional received channels over the subcarriers and OFDM symbols for one slot (where differences are computed over slot indices, milliseconds, etc.)

The REs that do not contain RS are filled with zeros.

Estimate of full two-dimensional channel over the subcarriers and OFDM symbols for current slot Ground truth of full two-dimensional channel over the subcarriers and OFDM symbols for next slot This can be a training label.

Auxiliary information:

UE speed,

UE trajectory,

UE location,

Coherence time,

Coherence bandwidth,

Delay spread,

Doppler spread,

Block error rate, and

Throughput.

Examples of outputs from an AI/ML model that can support differential CSI prediction include:

Full two-dimensional predicted channel over the subcarriers and OFDM symbols for next slot.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:

a transceiver configured to:

transmit capability information indicating capability of the UE to support machine learning (ML) based channel state information (CSI) prediction in one or more domains, wherein the one or more domains include a temporal domain, receive configuration information that indicates parameters for the ML based CSI prediction in the one or more domains, wherein the parameters include a time interval between CSI measurements and a duration of a window of CSI measurements, and receive CSI reference signals (RSs); and a processor operably coupled to the transceiver, the processor configured to:

measure the CSI-RSs, determine, based on the configuration information and the measured CSI-RSs, (i) a plurality of CSI predictions in the one or more domains, the determined plurality of CSI predictions corresponding to the time interval and the duration of the window and (ii) a differential temporal CSI prediction based on differences between CSI predictions, and determine a CSI report including one or more of the plurality of CSI predictions, wherein the transceiver is further configured to transmit the CSI report including the differential temporal CSI prediction.

2. The UE of claim 1, wherein:

the CSI report includes dependency information indicating dependencies between CSI predictions in the plurality of CSI predictions, and the dependency information includes a prediction of a difference between a first CSI prediction and at least a second CSI prediction.

3. The UE of claim 2, wherein:

the configuration information is received via radio resource control (RRC) signaling, the configuration information includes an indication indicating to use a differential temporal CSI prediction method, and the indication is via a flag that enables the differential temporal CSI prediction method or parameters for the differential temporal CSI prediction method.

4. The UE of claim 1, wherein:

the processor is further configured to:

identify assistance information for determination of a CSI prediction method for the ML based CSI prediction, wherein the assistance information comprises at least one of a block error rate, a throughput, a UE speed, a UE acceleration, and determine, based on the assistance information, to request a configuration for the UE to use a differential CSI prediction method; and the transceiver is further configured to transmit the request via an uplink channel.

5. The UE of claim 1, wherein:

the configuration information indicates to use a differential CSI prediction method for the ML based CSI prediction, the transceiver is further configured to receive an instruction to stop using the differential CSI prediction method for the ML based CSI prediction based on differential CSI error propagation, and the processor is further configured to switch, after receipt of the instruction, to using a full CSI prediction method for the ML based CSI prediction.

6. The UE of claim 1, wherein:

the configuration information indicates to perform the CSI prediction for a plurality of subbands (SBs), the CSI RSs are received for a first of the plurality of subbands, and the processor is further configured to determine a CSI prediction for a second of the plurality of SBs based on the measured CSI-RSs for the first SB.

7. The UE of claim 6, wherein the configuration information includes the parameters for additional CSI-RS measurement resources in one or more SBs of the plurality of the SBs where the CSI-RSs are not received.

8. The UE of claim 1, wherein:

the configuration information indicates to perform the CSI prediction for a plurality of subbands (SBs), a first number of the CSI RSs are received for a first of the plurality of subbands with a first density, a second number of the CSI RSs are received for a second of the plurality of subbands with a second density that is lower than the first density, and the processor is further configured to determine a CSI prediction for the second SB based on at least in part on the first number of CSI-RSs for the first SB.

9. A base station (BS), comprising:

a transceiver configured to:

receive, from a user equipment (UE), capability information indicating capability of the UE to support machine learning (ML) based channel state information (CSI) prediction in one or more domains, wherein the one or more domains include a temporal domain, transmit configuration information that indicates parameters for the ML based CSI prediction in the one or more domains, wherein the parameters include a time interval between CSI measurements and a duration of a window of CSI measurements, transmit CSI reference signals (RSs), and receive a CSI report including one or more CSI predictions of a plurality of CSI predictions and a differential temporal CSI prediction, wherein the plurality of CSI predictions and the differential temporal CSI prediction are based on the configuration information and the CSI-RSS, wherein the plurality of CSI predictions correspond to the time interval and the duration of the window, and wherein the differential temporal CSI prediction is determined based on differences between CSI predictions.

10. The BS of claim 9, wherein:

the CSI report includes dependency information indicating dependencies between CSI predictions in the plurality of CSI predictions, and the dependency information includes a prediction of a difference between a first CSI prediction and at least a second CSI prediction.

11. The BS of claim 10, wherein:

the configuration information is transmitted via radio resource control (RRC) signaling, the configuration information includes an indication indicating to use a differential temporal CSI prediction method, and the indication is via a flag that enables the differential temporal CSI prediction method or parameters for the differential temporal CSI prediction method.

12. The BS of claim 9, wherein:

the transceiver is further configured to receive a request for a configuration for the UE to use a differential CSI prediction method based on assistance information, and the assistance information comprises at least one of a block error rate, a throughput, a UE speed, a UE acceleration.

13. The BS of claim 9, wherein:

the configuration information indicates to use a differential CSI prediction method for the ML based CSI prediction, and the transceiver is further configured to:

transmit an instruction to stop using the differential CSI prediction method for the ML based CSI prediction based on differential CSI error propagation, and receive, after transmission of the instruction, a next CSI report that is based on a full CSI prediction method for the ML based CSI prediction.

14. The BS of claim 9, wherein:

the configuration information indicates to perform the CSI prediction for a plurality of subbands (SBs), the CSI RSs are transmitted for a first of the plurality of subbands, and the plurality of CSI predictions includes a CSI prediction for a second of the plurality of SBs that is based on the CSI-RSs for the first SB.

15. The BS of claim 14, wherein the configuration information includes the parameters for additional CSI-RS measurement resources in one or more SBs of the plurality of the SBs where the CSI-RSs are not transmitted.

16. The BS of claim 9, wherein:

the configuration information indicates to perform the CSI prediction for a plurality of subbands (SBs), a first number of the CSI RSs are transmitted for a first of the plurality of subbands with a first density, a second number of the CSI RSs are transmitted for a second of the plurality of subbands with a second density that is lower than the first density, and the plurality of CSI predictions includes a CSI prediction for the second SB that is based on at least in part on the first number of CSI-RSs for the first SB.

17. A method performed by a user equipment (UE), the method comprising:

transmitting capability information indicating capability of the UE to support machine learning (ML) based channel state information (CSI) prediction in one or more domains, wherein the one or more domains include a temporal domain;

receiving configuration information that indicates parameters for the ML based CSI prediction in the one or more domains, wherein the parameters include a time interval between CSI measurements and a duration of a window of CSI measurements;

receiving CSI reference signals (RSS);

measuring the CSI-RSs;

determining, based on the configuration information and the measured CSI-RSs, (i) a plurality of CSI predictions in the one or more domains, the determined plurality of CSI predictions corresponding to the time interval and the duration of the window and (ii) a differential temporal CSI prediction based on differences between CSI predictions;

determining a CSI report including one or more of the plurality of CSI predictions; and transmitting the CSI report including the differential temporal CSI prediction.

18. The method of claim 17, wherein:

the CSI report includes dependency information indicating dependencies between CSI predictions in the plurality of CSI predictions, and the dependency information includes a prediction of a difference between a first CSI prediction and at least a second CSI prediction.

19. The method of claim 18, wherein:

the configuration information is received via radio resource control (RRC) signaling, the configuration information includes an indication indicating to use a differential temporal CSI prediction method, and the indication is via a flag that enables the differential temporal CSI prediction method or parameters for the differential temporal CSI prediction method.

20. The method of claim 17, further comprising:

identifying assistance information for determination of a CSI prediction method for the ML based CSI prediction, wherein the assistance information comprises at least one of a block error rate, a throughput, a UE speed, a UE acceleration;

determining, based on the assistance information, to request a configuration for the UE to use a differential CSI prediction method; and transmitting the request via an uplink channel.

* * * * *